(12) United States Patent
Kim et al.

(10) Patent No.: US 9,143,917 B2
(45) Date of Patent: Sep. 22, 2015

(54) BLUETOOTH COMMUNICATION METHOD AND TERMINAL ADOPTING SAME

(75) Inventors: Bo-min Kim, Seoul (KR); Min-kyu Park, Seongnam-si (KR); Yong-gook Park, Yongin-si (KR); Tae-young Kang, Uijeongbu-si (KR); Seong-woon Kim, Yongin-si (KR); Hyoung-il Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 439 days.

(21) Appl. No.: 13/392,773

(22) PCT Filed: Aug. 25, 2010

(86) PCT No.: PCT/KR2010/005688
§ 371 (c)(1),
(2), (4) Date: Feb. 27, 2012

(87) PCT Pub. No.: WO2011/025253
PCT Pub. Date: Mar. 3, 2011

(65) Prior Publication Data
US 2012/0156997 A1    Jun. 21, 2012

(30) Foreign Application Priority Data

Aug. 26, 2009  (KR) .................. 10-2009-0079304
Nov. 23, 2009  (KR) .................. 10-2009-0113202

(51) Int. Cl.
*H04B 7/00*  (2006.01)
*H04W 8/00*  (2009.01)
*H04W 84/18* (2009.01)

(52) U.S. Cl.
CPC .............. *H04W 8/005* (2013.01); *H04W 84/18* (2013.01)

(58) Field of Classification Search
CPC . H04W 88/06; H04W 84/18; H04W 52/0216; H04W 56/00; H04W 88/04; H04W 48/16; H04W 52/0229; H04W 56/0015; H04W 8/005; H04W 36/08
USPC ....................................................... 455/41.2
See application file for complete search history.

(56) References Cited

U.S. PATENT DOCUMENTS 7,831,207 B2    11/2010  Mercurio et al.
7,907,901 B1 *  3/2011  Kahn et al. ................... 455/41.2
(Continued)

FOREIGN PATENT DOCUMENTS

CN    101401057    4/2009
CN    101489197    7/2009
(Continued)

OTHER PUBLICATIONS

Chinese Office Action dated Nov. 14, 2014 issued in counterpart application No. 201080038362.X.
(Continued)

*Primary Examiner* — Ajibola Akinyemi
(74) *Attorney, Agent, or Firm* — The Farrell Law Firm, P.C.

(57) ABSTRACT

A communication method and a terminal adopting same are provided. The method includes setting a calling terminal in a short-range wireless communication standby mode; and transmitting, upon detecting movement of the calling terminal during the short-range wireless communication standby mode, data to a called terminal via a short-range wireless communication.

23 Claims, 37 Drawing Sheets

(56) References Cited

U.S. PATENT DOCUMENTS

| | | | |
|---|---|---|---|
| 8,514,196 B2 * | 8/2013 | Kim | 345/173 |
| 8,813,188 B2 | 8/2014 | Vauclair et al. | |
| 2006/0094402 A1 * | 5/2006 | Kim | 455/411 |
| 2007/0207833 A1 * | 9/2007 | Tsai et al. | 455/556.1 |
| 2007/0211573 A1 | 9/2007 | Hermansson | |
| 2008/0119237 A1 | 5/2008 | Kim | |
| 2008/0320587 A1 | 12/2008 | Vauclair et al. | |
| 2009/0088076 A1 | 4/2009 | Mercurio et al. | |
| 2009/0176505 A1 | 7/2009 | Van Deventer et al. | |
| 2014/0113567 A1 * | 4/2014 | Kennedy | 455/41.2 |

FOREIGN PATENT DOCUMENTS

| | | |
|---|---|---|
| CN | 101809955 | 8/2010 |
| JP | 2008-512891 | 4/2008 |
| JP | 2009-159066 | 7/2009 |
| JP | 2009-188989 | 8/2009 |
| KR | 1020060012948 | 2/2006 |
| KR | 1020060039810 | 5/2006 |
| KR | 1020060048283 | 5/2006 |
| WO | WO 2005041110 A2 * | 5/2005 |
| WO | WO 2006/027725 | 3/2006 |

OTHER PUBLICATIONS

Australian Examination Report dated Jan. 12, 2015 issued in counterpart application No. 2010287169.

Japanese Office Action dated Feb. 16, 2015 issued in counterpart application No. 2012-526649.

Notice of Acceptance dated May 27, 2015 issued in counterpart application No. 2010287169.

Chinese Office Action dated May 25, 2015 issued in counterpart application No. 201080038362.X.

* cited by examiner

US 9,143,917 B2

BLUETOOTH COMMUNICATION METHOD AND TERMINAL ADOPTING SAME

PRIORITY

This application claims priority to PCT Application No. PCT/KR2010/005688, filed in the Korean Intellectual Property Office Aug. 25, 2010, to Korean Patent Application No. 10-2009-0079304, filed in the Korean Intellectual Property Office on Aug. 26, 2009, and to Korean Patent Application No. 10-2009-0113202, filed on Nov. 23, 2009 the entire contents of each of which are incorporated herein by reference.

FIELD OF THE INVENTION

The present invention relates generally to a Bluetooth communication method and a terminal adopting the same, and more particularly, to a Bluetooth communication method in which a multimedia file is transmitted using a Bluetooth communication, and a terminal adopting the Bluetooth communication method.

DESCRIPTION OF THE RELATED ART

Bluetooth is a wireless communication technique for transmitting data between mobile devices. Herein, the term "Bluetooth" refers to devices and communications in accordance with the BLUETOOTH® specification. Since Bluetooth uses low power (100 mW) at a low cost, and divides a frequency band into multiple frequency sub-bands to be used for communication, Bluetooth can enable the transmission of data using multiple frequencies. Therefore, Bluetooth has increasingly attracted public attention as a wireless communication technique for mobile devices.

However, configuring a Bluetooth communication between Bluetooth devices is generally complicated. Accordingly, it may often be difficult and require a significant amount of time for a Bluetooth device to search for connect to another Bluetooth device. The configuration of a Bluetooth connection between Bluetooth devices may involve exchanging a password for security purposes, as well as exchanging a User Interface (UI) for searching for a file to be transmitted after the Bluetooth pairing of Bluetooth devices may be complicated.

Since users expect configuration and use of Bluetooth communications to become increasingly easy and more convenient over time, there is a need for a method to transmit or receive data via a Bluetooth connection in an easy and intuitive manner.

SUMMARY OF THE INVENTION

The present invention has been made to address at least the above problems and/or disadvantages and to provide at least the advantages described below. Accordingly, an aspect of the present invention provides a communication method in which data is transmitted to an external terminal via a short-range wireless communication in response to a movement being detected during a short-range wireless communication standby mode, and a terminal adopting the communication method.

According to an aspect of the present invention, a communication method of a calling terminal that communicates with a called terminal via short-range wireless communication is provided. The method includes setting the calling terminal in a short-range wireless communication standby mode; and transmitting, upon detecting movement of the calling terminal during the short-range wireless communication standby mode, data to the called terminal via a short-range wireless communication.

According to another aspect of the present invention, a calling terminal that communicates with a called terminal via short-range wireless communication is provided. The calling terminal includes a communication unit for transmitting data to the called terminal via a short-range wireless communication; and a control unit for setting the calling terminal in a short-range wireless communication standby mode, and controlling the communication unit to transmit the data to the called terminal via the short-range wireless communication in response to detection of a movement of the calling terminal during the short-range wireless communication standby mode.

According to another aspect of the present invention, a communication method of a short-range wireless communication system in which a calling terminal and a called terminal communicate with each other via short-range wireless communication is provided. The method includes setting the calling terminal in a short-range wireless communication standby mode; setting the called terminal in the short-range wireless communication standby mode; and transmitting, in response to detection of a movement of the calling terminal during the short-range wireless communication standby mode of the calling and called terminals, by the calling terminal, data to the called terminal via a short-range wireless communication.

According to another aspect of the present invention, a communication method of a calling terminal that communicates with a called terminal via short-range wireless communication is provided. The method includes setting the called terminal in a short-range wireless communication standby mode; and in response to detection of a movement during the short-range wireless communication standby mode, receiving data from the calling terminal via a short-range wireless communication.

According to another aspect of the present invention, a communication method of a calling terminal that communicates with a called terminal via short-range wireless communication is provided. The method includes setting the calling terminal in a short-range wireless communication standby mode; selecting, in response to detection of a movement during the short-range wireless communication standby mode, the called terminal as a target terminal for the calling terminal for short-range wireless communication by using a voice signal; pairing the calling terminal with the called terminal; and transmitting data to the called terminal via short-range wireless communication.

According to another aspect of the present invention, a calling terminal that communicates with a called terminal via short-range wireless communication is provided. The calling terminal includes a communication unit for transmitting data to or receives data from the called terminal via a short-range wireless communication; and a control unit for setting the calling terminal in a short-range wireless communication standby mode, wherein, in response to detection of a movement during the short-range wireless communication standby mode, the control unit selects the called terminal as a target terminal for the calling terminal to communicate with, via short-range wireless communication, by using a voice signal, pairs, via short-range wireless communication, the calling terminal with the called terminal, and transmits data to the called terminal via the short-range wireless communication.

According to another aspect of the present invention, a communication method of a called terminal that communicates with a calling terminal via short-range wireless communication is provided. The method includes setting the called terminal in a short-range wireless communication standby mode; pairing, in response to receipt of a voice signal from the calling terminal, the called terminal with the calling terminal using the voice signal; and receiving a file from the calling terminal via a short-range wireless communication.

According to an aspect of the present invention, a called terminal that communicates with a calling terminal via short-range wireless communication is provided. The called terminal includes a communication unit which transmits data to or receives data from the calling terminal via short-range wireless communication; and a control unit for, in response to receipt of a voice signal from the calling terminal, pairing the called terminal with the calling terminal using the voice signal, and receiving a file from the calling terminal via a short-range wireless communication.

BRIEF DESCRIPTION OF THE DRAWINGS

The above and other aspects, features and advantages of embodiments of the present invention will be more apparent from the following description taken in conjunction with the accompanying drawings, in which.

DETAILED DESCRIPTION OF EMBODIMENTS OF THE INVENTION

Figure 1:
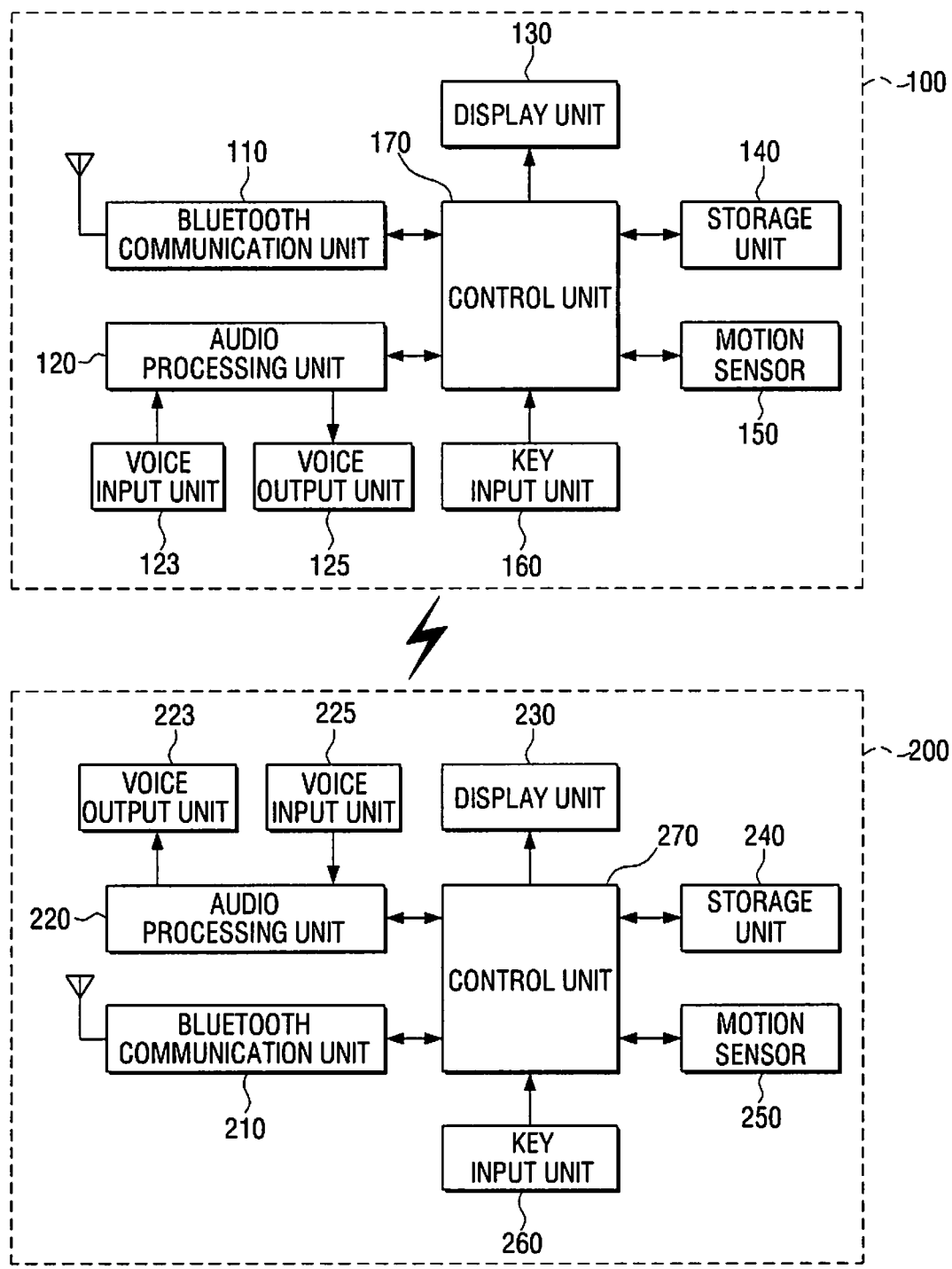
FIG. 1 is a block diagram illustrating two Bluetooth terminals for transmitting a file, according to an embodiment of the present invention.

Embodiments of the present invention are described more fully hereinafter with reference to the accompanying drawings. In the following description of the present invention, the same or similar drawing reference numerals are used for the same elements even in different drawings. Additionally, detailed descriptions of constructions or processes known in the art may be omitted to avoid obscuring the subject matter of the present invention.

FIG. 1 is a block diagram illustrating two Bluetooth terminals for transmitting a file, according to an embodiment of the present invention.

For convenience, a terminal that initiates transmission of data may be referred to as a calling terminal, such as the first terminal 100, and a terminal that receives data from the calling terminal may be referred to as a called terminal, such as the second terminal 200.

Referring to FIG. 1, the first terminal 100 includes a Bluetooth communication unit 110, an audio processing unit 120, a voice input unit 123, a voice output unit 125, a display unit 130, a storage unit 140, a motion sensor 150, a key input unit 160, and a control unit 170.

The Bluetooth communication unit 110 may correspond to a communication method for a Personal Area Network (PAN) between terminals that may communicate with each other via a short-range wireless communication, and may be a wireless communication module for transmitting and/or receiving a signal by forming a communication channel over a short distance.

A typical Bluetooth communication method involves using a 2.4 GHz Industrial Scientific Medical (ISM) band. The ISM band may be freely used without requiring an additional license. According to the typical Bluetooth communication method, a 2 MHz guard band and a 3.5 MHz guard band are provided below and above the ISM band, respectively, thereby preventing any interference with other devices. The typical Bluetooth communication method also involves using a frequency hopping technique and may result in 1600 frequency hops per second.

The Bluetooth communication unit 110 may perform a series of operations for transmitting or receiving data to one or more short-range-communicable terminals, which are located within a short range of the first terminal 100 and may communicate with the first terminal 100 via a wireless interface. For example, the Bluetooth communication unit 110 may receive multimedia data transmitted by one or more short-range-communicable terminals, and may transmit the received multimedia data to the control unit 170.

The audio processing unit 120 may process a Dual-Ton Multi-Frequency (DTMF) signal provided by the control unit 170, and may output the processed DTMF signal to the voice output unit 125. Herein, the term 'DTMF signal' refers a type of audio signal obtained by converting the Bluetooth Device (BD) address of a terminal into a DTMF using DTMF signaling, which is a communication technique for converting numeric data into a voice signal.

For example, a BD address '127;0;0;7' may be converted into a DTMF '127*0*0*7,' and a separator 'ti' may be inserted into the DTMF '127*0*0*7,' thereby generating a DTMF signal '#127*0*0*7.' The separator 'it' may be inserted into a DTMF in order to allow the second terminal 200 to easily recognize the beginning of a DTMF signal, even when the DTMF signal is transmitted repeatedly to the second terminal 200.

The voice input unit 123 may receive a voice signal or a DTMF signal from an external source, and may transmit the received signal to the audio processing unit 120. For example, the voice input unit 123 may receive a DTMF signal requesting Bluetooth pairing from the second terminal 200. For example, the voice input unit 123 may be implemented as a microphone.

The voice output unit 125 may output a processed DTMF signal provided by the audio processing unit 120. For example, the voice output unit 125 may be implemented as a speaker.

The display unit 130 may visually display various information indicating the state and the operation of the first terminal 100. The display unit 130 may also display a multimedia file to be transmitted via Bluetooth on a screen of the display unit 130. Herein, the term 'multimedia file' may refer to various types of files including a text file, an image file, a video file, a music file, etc. The display unit 130 may display a file selected from the storage unit 140.

The storage unit 140 may store various programs and information for operating the first terminal 100. The storage unit 140 may also store various multimedia files.

The motion sensor 150 may detect the movement of the first terminal 100. For example, an acceleration sensor or a geomagnetic sensor may be used as the motion sensor 150. The acceleration sensor may detect a user's movement based on vibration and/or based on other similar forms of detection. The acceleration sensor may measure not only dynamic acceleration but also static acceleration with respect to the gravitational force. The acceleration sensor may measure static acceleration by detecting the degree to which an axis of the acceleration sensor is tilted with respect to the ground when placed in parallel with the surface of the ground, i.e., perpendicularly to the direction of the gravitational force. The tilt of the acceleration sensor may be calculated as the sine value of a gravitational acceleration value of each axis of the acceleration sensor with respect to the surface of the ground when the acceleration sensor stands still.

The geomagnetic sensor may detect a geomagnetic signal by performing a particular operation, such as measurement of terrestrial magnetism. Terrestrial magnetism refers to the Earth's magnetic field, which varies periodically or irregularly. To determine the Earth's magnetic field at a particular location on the Earth, three independent elements, i.e., a horizontal component, an azimuth angle, and a dip angle, need to be determined. To detect the Earth's magnetic field, x-, y-, and z-axis sensors may be used. The x- and y-axis sensors may detect a left-right direction and a forward-backward direction, respectively. The z-axis sensor may detect a vertical direction.

The motion sensor 150 may detect any movement of the first terminal 100. In response to a movement of the first terminal 100 being detected, the motion sensor 150 may transmit information on the detected movement to the control unit 170. Herein, the term 'movement of the first terminal 100' may refer to various forms of movement including a tilt of the first terminal 100, a shake of the first terminal 100, a tap on the first terminal 100, etc.

The key input unit 160 may be implemented as a keypad, a touch screen or a touchpad. The key input unit 160 may transmit an input signal, which is received from the user, to the control unit 170 to control the operation of the first terminal 100. For example, the key input unit 160 may receive a command to set the first terminal 100 in a Bluetooth standby mode from the user in response to the user's manipulation of the key input unit 160 (for example, in response to a user pressing a Bluetooth button on the key input unit 160).

The manners in which first terminal 100 may be placed in the Bluetooth standby mode according to embodiments of the present invention are not limited to the specific manners set forth herein, and other manners of placing the first terminal 100 into the Bluetooth standby mode may be used in accordance with embodiments of the present invention. Herein, the standby mode of the first terminal 100 is an operating mode in which the display unit 130 is activated but there is no input to the display unit 130. When the motion sensor 150, the voice input unit 123, and the voice output unit 125 are all activated during a standby mode of the first terminal 100, the first terminal 100 may be placed in the Bluetooth standby mode without the need for additional manipulation by the user. For example, when the first terminal 100 is placed on a desk with the motion sensor 150, the voice input unit 123, and the voice output unit 125 activated, the first terminal 100 may be automatically placed in the Bluetooth standby mode.

The control unit 170 controls the general operation of the first terminal 100. For example, the control unit 170 may set the first terminal 100 in the Bluetooth standby mode in response to the receipt of a command from the user via the key input unit 160.

The Bluetooth standby mode is a standby mode for performing Bluetooth communication. During the Bluetooth standby mode, the voice input unit 123, the voice output unit 125, the motion sensor 150, and the Bluetooth communication unit 110 may all be activated, such that the first terminal 100 may sense the input and output of voice data, sense any movement or motion, and may be prepared for performing Bluetooth communication. In response to a predetermined movement of the user being detected during the Bluetooth standby mode, the first terminal 100 performs Bluetooth pairing and the transmission of data. For example, in response to the detection of the predetermined movement from the user, the control unit 170 determines whether the first terminal 100 and the second terminal 200 are paired with each other. In response to a determination that the first terminal 100 and the second terminal 200 are not paired yet, the control unit 170 pairs the first terminal 100 with the second terminal 200.

The pairing of the first terminal 100 and the second terminal 200 may be performed in various manners. For example, the pairing of the first terminal 100 and the second terminal 200 may be performed using a DTMF signal.

More specifically, the control unit 170 may convert the BD address of the first terminal 100 into a DTMF signal, and may control the DTMF signal to be output via the voice output unit 125.

In response to the output of the DTMF signal, one or more terminals that are located in the vicinity of the first terminal 100 may be exposed to the DTMF signal. Since the DTMF signal is an audio signal, any neighboring terminal in the Bluetooth standby mode, i.e., any neighboring terminal with its voice input unit activated, may receive the DTMF signal.

For example, if the second terminal 200 is in the Bluetooth standby mode, the second terminal 200 may receive the DTMF signal, which is output from the first terminal 100. In response to the receipt of a DTMF signal requesting a Bluetooth connection from the second terminal 200 via the voice input unit 123, the control unit 170 will pair the first terminal 100 with the second terminal 200.

As explained above, the control unit 170 may Bluetooth-pair the first terminal 100 with the second terminal 200 by using a DTMF signal. However, Bluetooth pairing according to embodiments of the present invention is not limited to the above-described method. Bluetooth pairing may be performed in various manners other than using a DTMF signal in accordance with embodiments of the present invention.

In response to the first terminal 100 being paired with the second terminal 200, the control unit 170 may transmit data to the second terminal 200 via the Bluetooth communication unit 110. For example, the term 'data' refers to data that may include, for example, a multimedia file such as a text file, an image file, a video file, a music file, etc.

In response to a detection of a movement of the first terminal 100 during the Bluetooth standby mode, the control unit 170 pairs the first terminal 100 with the second terminal 200, which is also in the Bluetooth standby mode, and transmits multimedia data to the second terminal 200 at the same time.

As explained above, in response to the detection of a movement of the first terminal 100 during the Bluetooth standby mode, the control unit 170 controls the first terminal 100 to serve as a Bluetooth transmitter and thus to transmit data. Therefore, the user may easily transmit data between the first terminal 100 and the second terminal 200 via Bluetooth communications.

Referring to FIG. 1, the second terminal 200 includes a Bluetooth communication unit 210, an audio processing unit 220, a voice input unit 223, a voice output unit 225, a display unit 230, a storage unit 240, a motion sensor 250, a key input unit 260, and a control unit 270.

The second terminal 200 has a structure similar to that of the first terminal 100, and thus, the following description of the structure and operation of the second terminal 200 mainly focuses on differences between the second terminal 200 and the first terminal 100. Since the first terminal 100 transmits data and the second terminal 200 receives data, there are relatively few differences in the respective functions of the first terminal 100 and the second terminal 200.

The control unit 270 may set the second terminal 200 in the Bluetooth standby mode.

The voice input unit 225 may receive a DTMF signal including the BD address of the first terminal 100 from the first terminal 100. The control unit 270 may identify the BD address of the first terminal from the received DTMF signal, and may generate a DTMF signal requesting Bluetooth pairing. The control unit 270 may output the generated DTMF signal via the audio output unit 223.

In response to the completion of the Bluetooth pairing of the first terminal 100 and the second terminal 200, the control unit 270 may receive multimedia data from the first terminal 100 via the Bluetooth communication unit 210. The control unit 270 may control the display unit 230 to display the received multimedia data on a screen of the display unit 230. Accordingly, the user may easily identify a file received by the second terminal 200.

By allowing the user to transmit data from the first terminal 100 to the second terminal 200 via Bluetooth, simply by moving the first terminal 100, it is possible to facilitate the transmission of data via Bluetooth. In addition, by setting a terminal from which a movement is detected as a transmitting terminal and a terminal from which no movement is detected as a receiving terminal, it is possible to further facilitate the transmission of data via Bluetooth.

Figure 2:
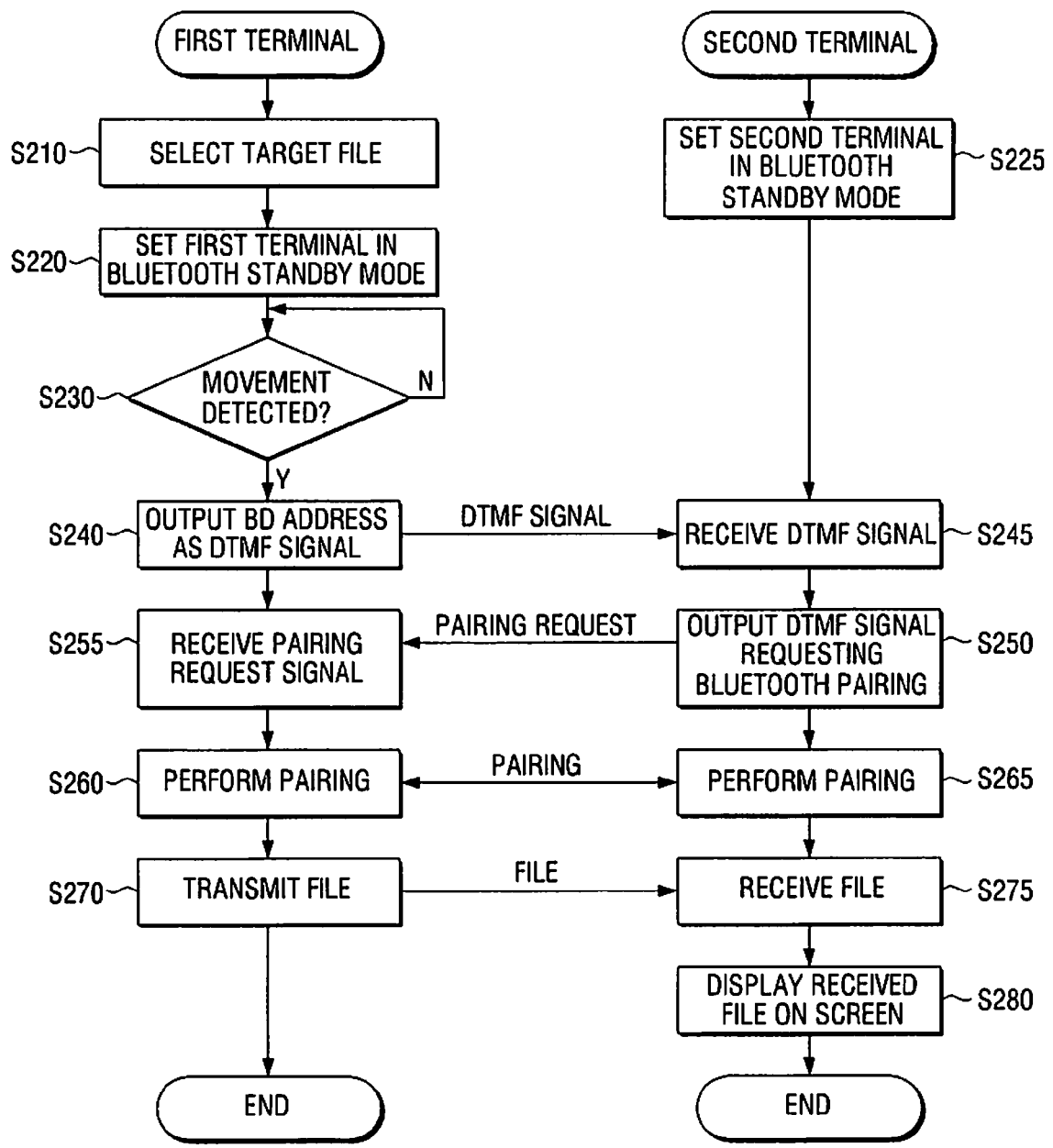
FIG. 2 is a flowchart illustrating a Bluetooth communication method for transmitting data between a first terminal and a second terminal, according to an embodiment of the present invention.

A Bluetooth communication method for transmitting data between the first terminal 100 and the second terminal 200 is described as follows with reference to FIG. 2. FIG. 2 is a flowchart illustrating a Bluetooth communication method for transmitting data between the first terminal 100 and the second terminal 200, according to an embodiment of the present invention.

Referring to FIG. 2, the first terminal 100 may select a target file to be transmitted in accordance with the user's selection, in step S210. Upon receiving a command from the user, the first terminal 100 is set in the Bluetooth standby mode, in step S220. For example, in response to the user pressing a button for switching to the Bluetooth standby mode, the first terminal 100 may be placed in the Bluetooth standby mode.

In response to the receipt of a command from the user, the second terminal 200 is also set in the Bluetooth standby mode, in step S225. When the first terminal 100 and the second terminal 200 are both placed in the Bluetooth standby mode, the first terminal 100 and the second terminal 200 communicate with each other via Bluetooth.

The first terminal 100 determines whether there is any movement detected from the first terminal 100, in step S230. Upon a determination that there is a movement detected from the first terminal 100 in step S230-Y, the first terminal 100 converts its BD address into a DTMF signal, and outputs the DTMF signal, in step S240.

The second terminal 200 receives the DTMF signal, in step S245, and determines the BD address of the first terminal 100 based on the received DTMF signal. The second terminal 200 generates a DTMF signal requesting Bluetooth pairing based on the determined BD address of the first terminal 100, and outputs the generated DTMF signal, in step S250.

The first terminal 100 receives the DTMF signal generated by the second terminal 200, in step S255. The first terminal 100 and the second terminal 200 are paired with each other, in steps S60 and S265.

The first terminal 100 transmits the target file to the second terminal via a Bluetooth communication, in step S270. The second terminal 200 receives the target file from the first terminal 100, in step S275, and displays the received file on a screen thereof, in step S280.

In this manner, the first terminal 100 may transmit data to the second terminal 200 via a Bluetooth communication. Since the first terminal 100 is configured to serve as a Bluetooth transmitter in response to the detection of a movement during the Bluetooth standby mode, the user may easily transmit a file from the first terminal 100 to the second terminal 200 simply by moving the first terminal 100.

In the beginning of the example illustrated in FIG. 2, the first terminal 100 and the second terminal 200 are yet to be paired. However, the example illustrated in FIG. 2 may also be applied to a case in which the first terminal 100 and the second terminal 200 are already paired with each other. The method of FIG. 2 may be modified to exclude steps S240 to S265 when the first terminal 100 and the second terminal 200 are already paired with each other, in accordance with embodiments of the present invention.

The transmission of a file via a Bluetooth communication will hereinafter be described with reference to FIGS. 3 to 7. FIGS. 3 to 7 are diagrams illustrating an example of transmitting a file via a Bluetooth communication using a movement of the first terminal 100.

Figure 3:
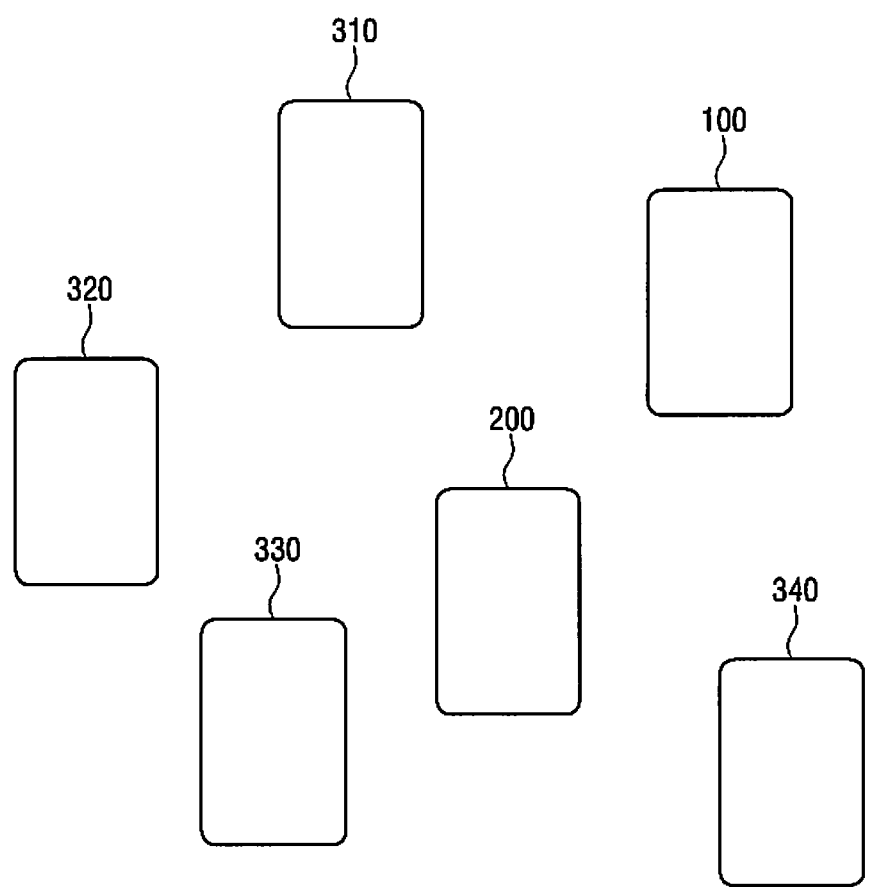
FIGS. 3 to 7 are diagrams illustrating an example of transmitting a file via a Bluetooth communication using the movement of the first terminal.
Figure 4:
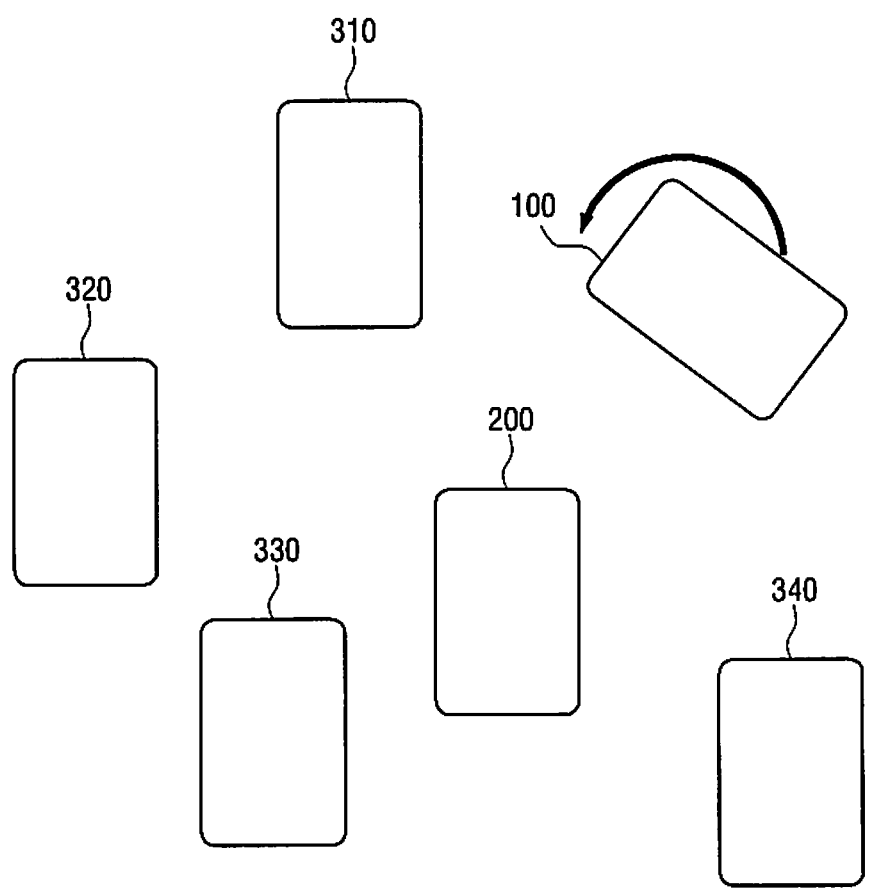

FIG. 3 illustrates an example of the arrangement of a plurality of terminals including the first terminal 100 and the second terminal 200. Referring to FIG. 3, the first terminal 100 and the second terminal 200 may be in the Bluetooth standby mode, and terminals 310, 320, 330, and 340 may be in a regular mode. In this case, the first terminal 100 and the second terminal 200 may perform Bluetooth communication.

Therefore, in response to the detection of a movement of the first terminal 100, the first terminal 100 may serve as a Bluetooth transmitter, and the second terminal 200 may serve as a Bluetooth receiver.

Figure 5:
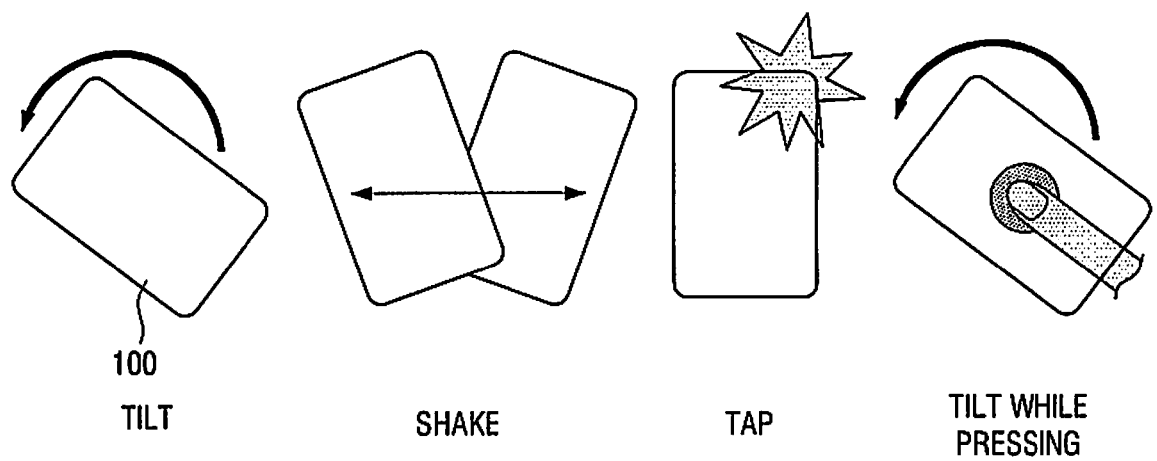

FIG. 5 illustrates examples of the movement of the first terminal 100. Referring to FIG. 5, the first terminal 100 may be moved by tilting the first terminal 100, shaking the first terminal 100, tapping on the first terminal 100, or tilting the first terminal 1000 while pressing on the first terminal 100, for example.

Figure 6:
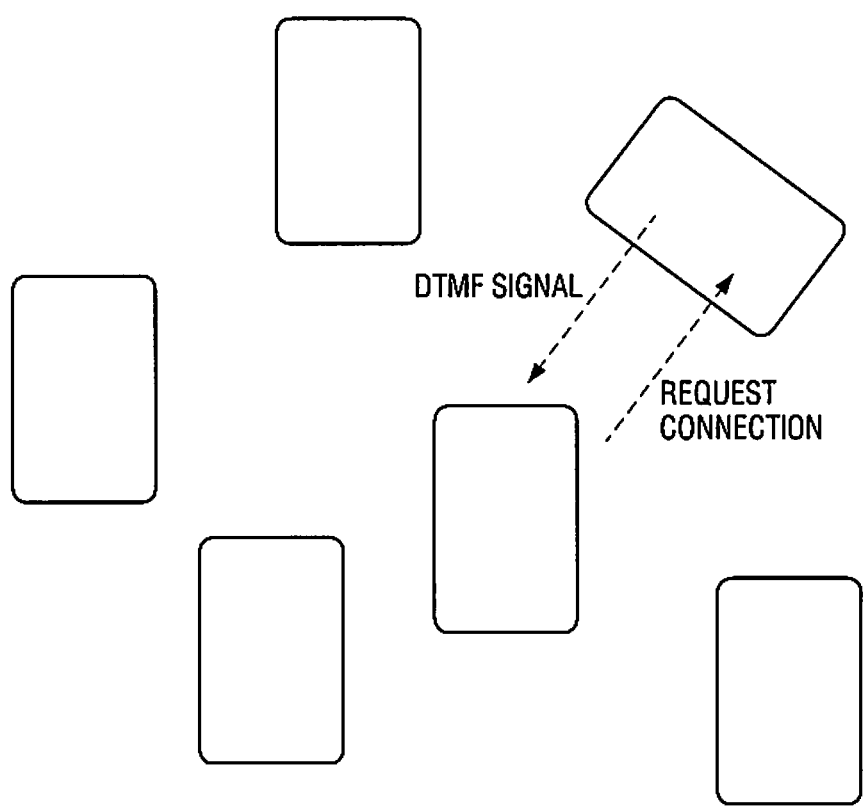

Referring to FIG. 6, in response to the movement of the first terminal 100, the first terminal 100 may convert its BD address into a DTMF signal and output the DTMF signal. The second terminal 200 may receive the DTMF signal and identify the BD address of the first terminal 100 from the received DTMF signal. The second terminal 200 may output a Bluetooth pairing request signal to the first terminal 100. In response to the Bluetooth pairing request, the first terminal 100 and the second terminal 200 may be Bluetooth-paired with each other.

Figure 7:
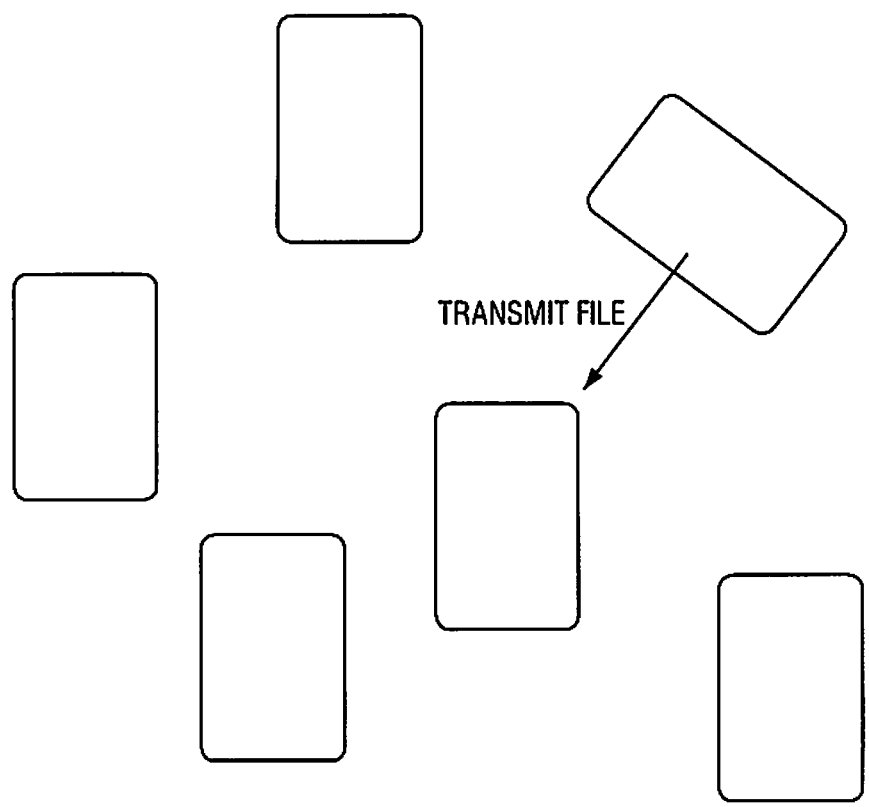

After the first terminal 100 and the second terminal 200 are Bluetooth-paired with each other, the first terminal 100 may transmit a file to the second terminal 200 via a Bluetooth communication, as illustrated in FIG. 7.

In this manner, it is possible to easily transmit a file from the first terminal 100 to the second terminal 200 by setting the first terminal 100 in the Bluetooth standby mode and moving the first terminal 100.

A Bluetooth communication method in a case in which the first terminal 100 and the second terminal 200 are already paired with each other according to an embodiment of the present invention is described as follows with reference to FIGS. 8 to 10.

Figure 8:
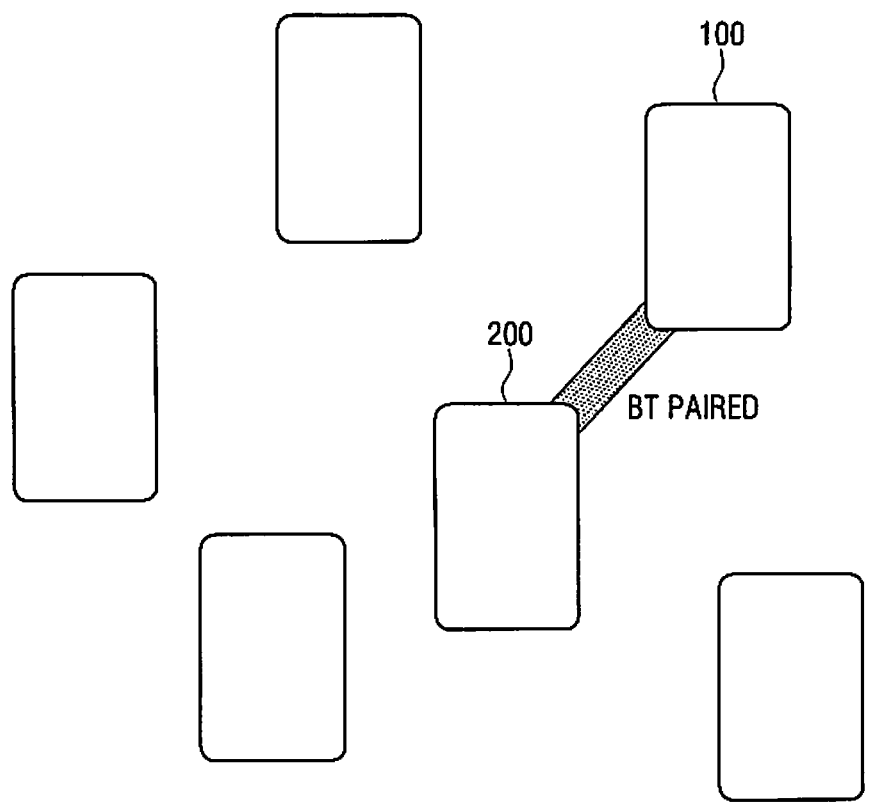
FIGS. 8 to 10 are diagrams illustrating an example of how the first terminal and the second terminal communicate with each other via Bluetooth in a case in which the first terminal and the second terminal are paired in advance.
Figure 9:
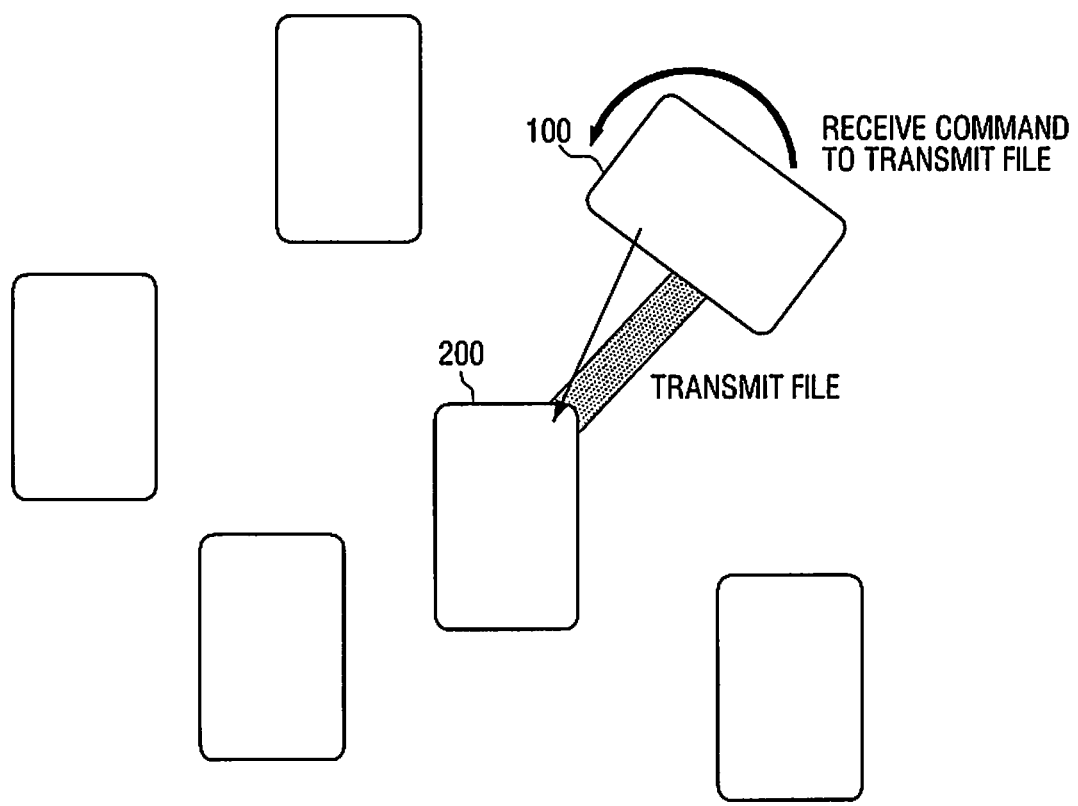
Figure 10:
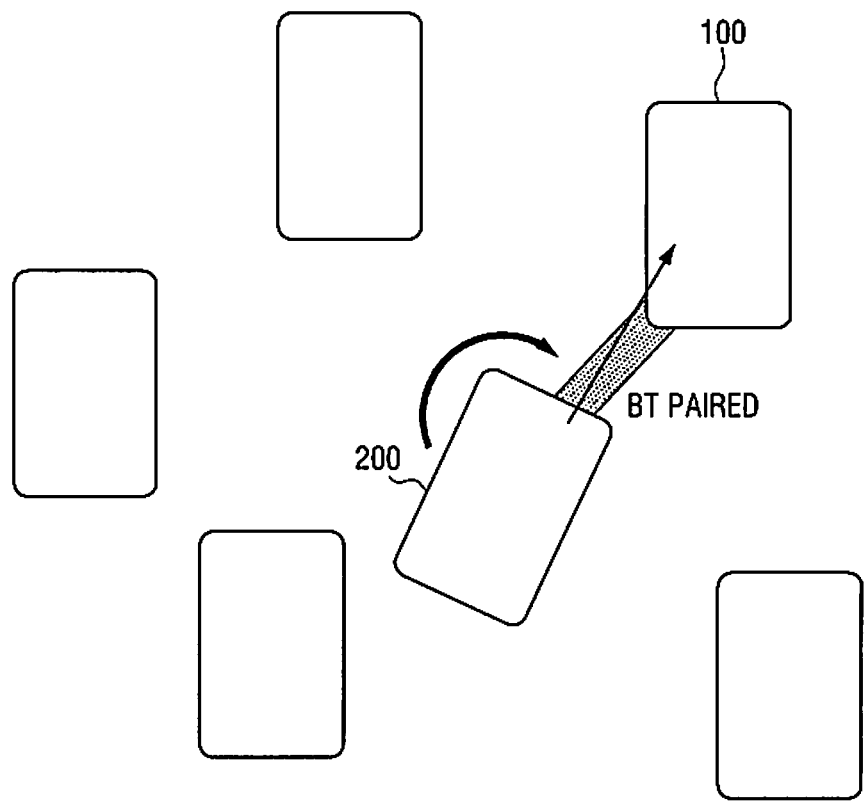

FIGS. 8 to 10 are diagrams illustrating an example communication between first terminal 100 and the second terminal 200 via Bluetooth when the first terminal 100 and the second terminal 200 are already paired with each other.

Referring to FIG. 8, the first terminal 100 and the second terminal 200 are already paired with each other. In this case, in response to a movement being entered to the first terminal 100, the first terminal 100 may serve as a Bluetooth transmitter, and the second terminal 200 may serve as a Bluetooth receiver, as shown in FIG. 9. Accordingly, the first terminal 100 may transmit a file to the second terminal 200 via Bluetooth.

Referring to FIG. 10, in response to movement of the second terminal 200, the second terminal 200 is designated as a Bluetooth transmitter, and the first terminal 100 is designated as a Bluetooth receiver. Accordingly, the second terminal 200 may transmit a file to the first terminal 100 via Bluetooth.

Figure 11:
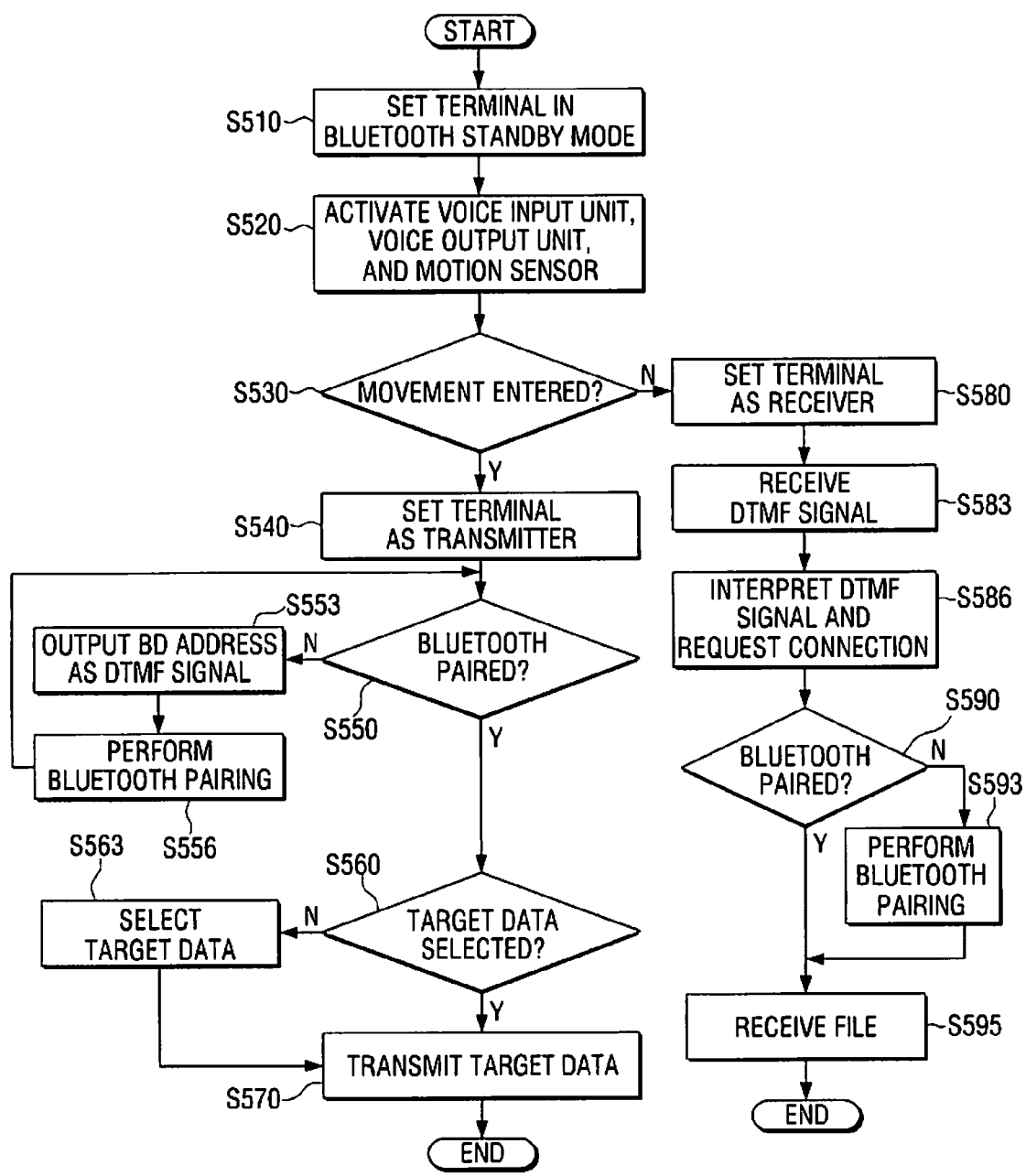
FIG. 11 is a flowchart illustrating a Bluetooth communication method of the first terminal, according to an embodiment of the present invention.

Operations of the first terminal 100 according to an embodiment of the present invention are described as follows with reference to FIG. 11. FIG. 11 is a flowchart illustrating a Bluetooth communication method of the first terminal 100, according to an embodiment of the present invention.

Referring to FIG. 11, the first terminal 100 is set in the Bluetooth standby mode, in step S510. The voice input unit 123, the voice output unit 125, and the motion sensor 150 of the first terminal 100 are activated, in step S520.

The first terminal 100 determines whether the first terminal 100 is moved, in step S530. In response to a movement being detected the first terminal 100, in step S530-Y, the first terminal 100 is set as a transmitting terminal, in step S540. Accordingly, the first terminal 100 may serve as a Bluetooth transmitter.

The first terminal 100 determines whether it is Bluetooth-paired with the second terminal 200, in step S550. Upon a determination that the first terminal 100 and the second terminal 200 are not paired with each other, in step S550-N, the BD address of the first terminal 100 is converted into a DTMF signal, and the DTMF signal is output, in step S553. After the DTMF signal is output, the first terminal 100 may be Bluetooth-paired with the second terminal 200, in step S556.

Upon a determination that the first terminal 100 is already Bluetooth-paired with the second terminal 200, in step S550-Y, the first terminal 100 determines whether there is data designated to be transmitted, in step S560. However, upon a determination that there is not any data designated to be transmitted, in step S560-N, the first terminal 100 designates data to be transmitted in accordance with the user's selection, in step S563. The first terminal 100 transmits the designated data to the second terminal 200, in step S570.

If the first terminal 100 does not detect any movement of the first terminal 100, in step S530-N, the first terminal 100 is set as a receiving terminal, in step S580, and the first terminal 100 serves as a Bluetooth receiver.

Upon receiving a DTMF signal from the second terminal 200, in step S583, the first terminal 100 interprets the received DTMF signal, and extracts the BD address of the second terminal 200 from the received DTMF signal. The first terminal 100 issues a request for a Bluetooth connection to the second terminal 200, in step S586.

The first terminal 100 determines whether it is Bluetooth-paired with the second terminal 200, in step S590. When the first terminal 100 and the second terminal 200 are not already Bluetooth-paired, in step S590-N, the first terminal 100 is Bluetooth-paired with the second terminal 200, in step S593. After the pairing is formed, first terminal 100 may receive a file from the second terminal 200, in step S595.

In short, a determination may be made as to whether the first terminal 100 should serve as a Bluetooth transmitter or a Bluetooth receiver based on whether the first terminal 100 is moved. Thus, a user may easily transmit data between the first terminal 100 and the second terminal 200 via Bluetooth.

Upon a determination that the first terminal 100 is already paired with the second terminal 200, in step S550-Y, the first terminal 100 displays information indicating that it is paired with the second terminal 200 on a screen of the first terminal 100. Accordingly, the user may easily identify which terminal the first terminal 100 is currently being paired with.

The first terminal 100 may be configured to output a DTMF signal even when paired with the second terminal 200 in accordance with an embodiment of the present invention. In this example, the first terminal 100 may identify the BD address of the second terminal 200 from the DTMF signal, and may thus prevent any error in the setting of a Bluetooth connection to the second terminal 200.

According to an embodiment of the present invention, the first terminal 100 may only be permitted to transmit data to the second terminal 200 when the second terminal 200 is not paired with other terminals. This scenario is described in further detail with reference to FIGS. 12 and 13.

Figure 12:
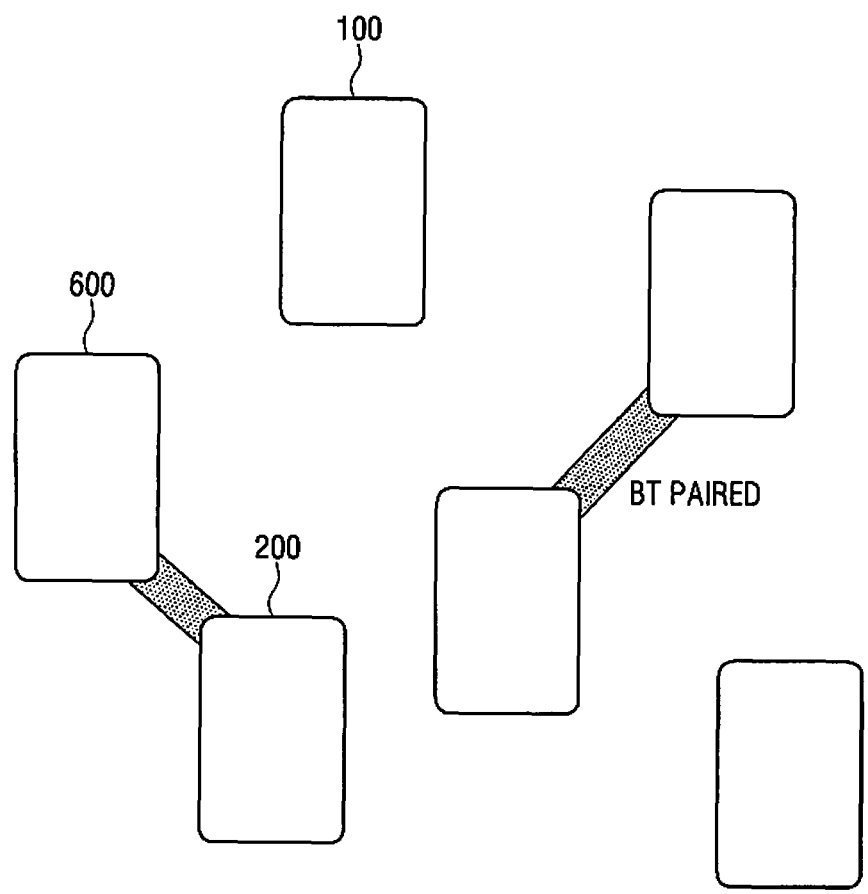
FIGS. 12 and 13 are diagrams illustrating a case in which the second terminal is paired with a third terminal.
Figure 13:
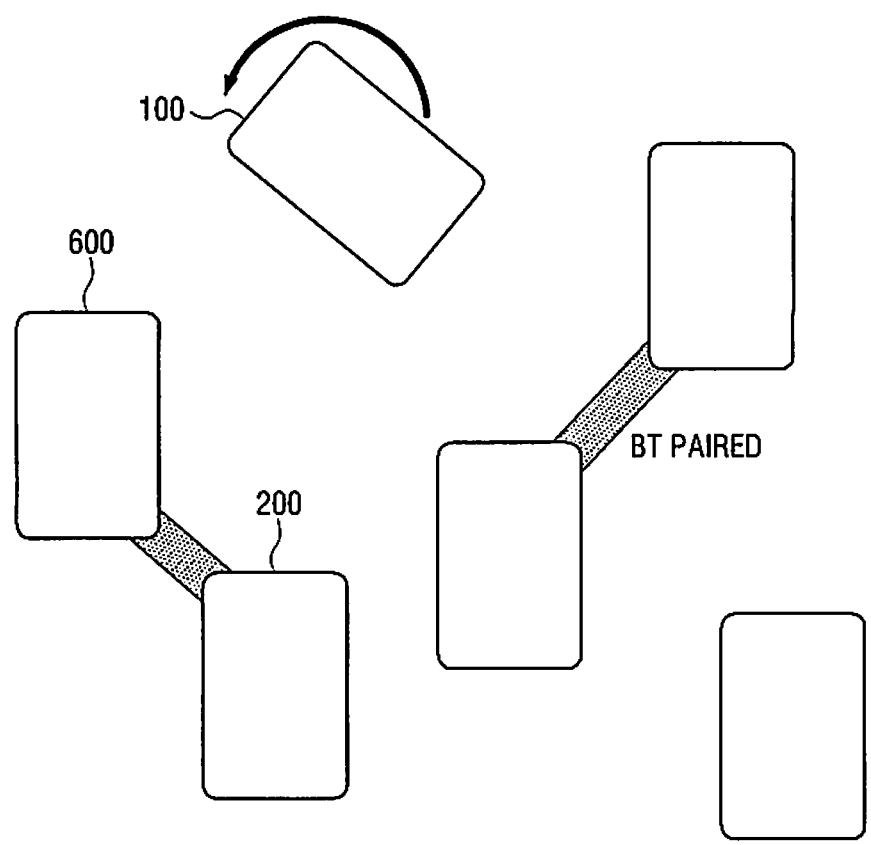

FIGS. 12 and 13 are diagrams illustrating a case in which the second terminal 200 is paired with a third terminal 600 according to an embodiment of the present invention.

Referring to FIG. 12, the second terminal 200 is paired with the third terminal 600. Therefore, as shown in FIG. 13, even when the first terminal 100 outputs a DTMF signal in response to a movement of the first terminal 100, the second terminal 200 does respond to the DTMF signal, regardless of whether the second terminal 200 is in the Bluetooth standby mode.

Accordingly, the first terminal 100 is not permitted to set a Bluetooth connection to the second terminal 200 when the second terminal 200 is Bluetooth-paired with another terminal.

Methods for executing the Bluetooth standby mode and transmitting a file are described as follows with reference to FIGS. 14 to 17.

Figure 14:
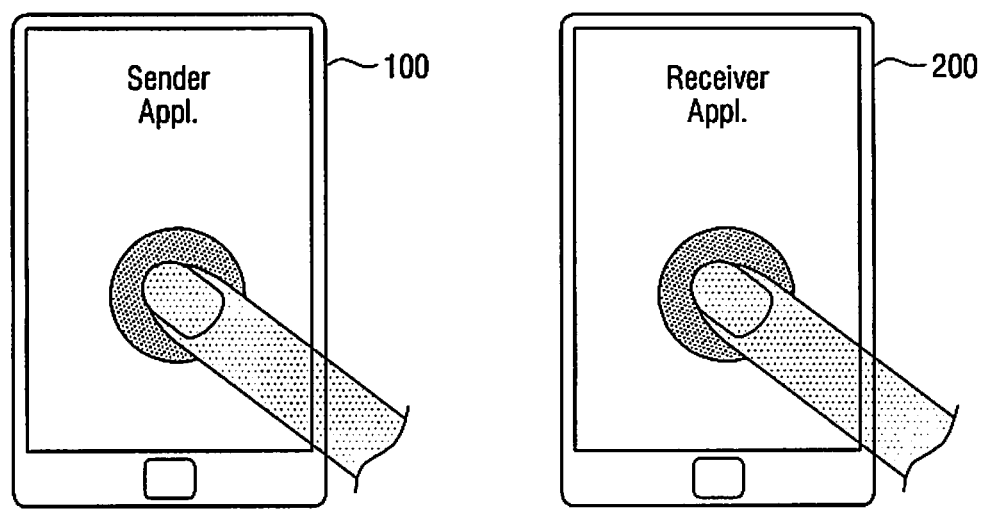
FIG. 14 is a diagram illustrating an example of a method to execute a Bluetooth standby mode.
Figure 15:
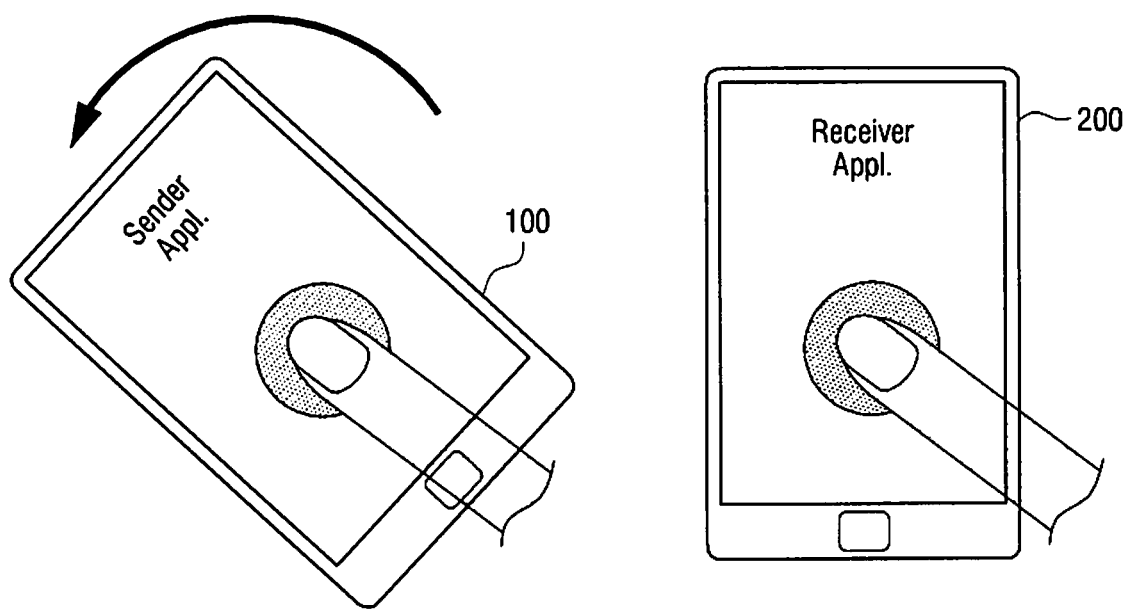
FIGS. 15 to 17 are diagrams illustrating examples of a movement for executing the transmission of a file.
Figure 16:
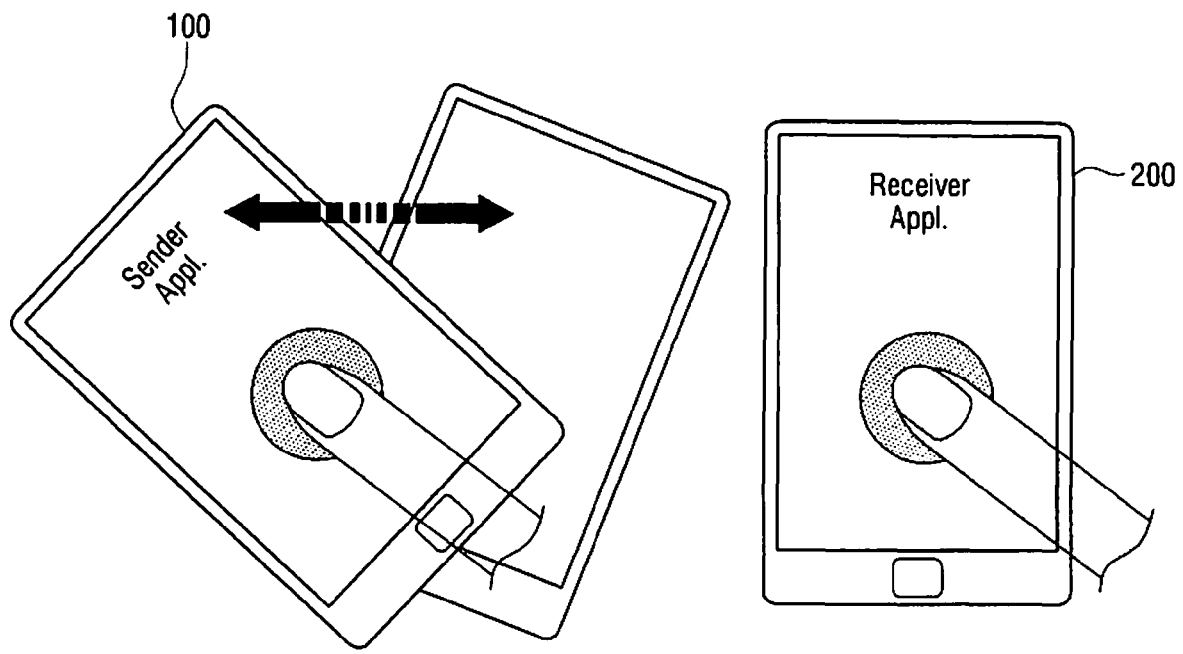
Figure 17:
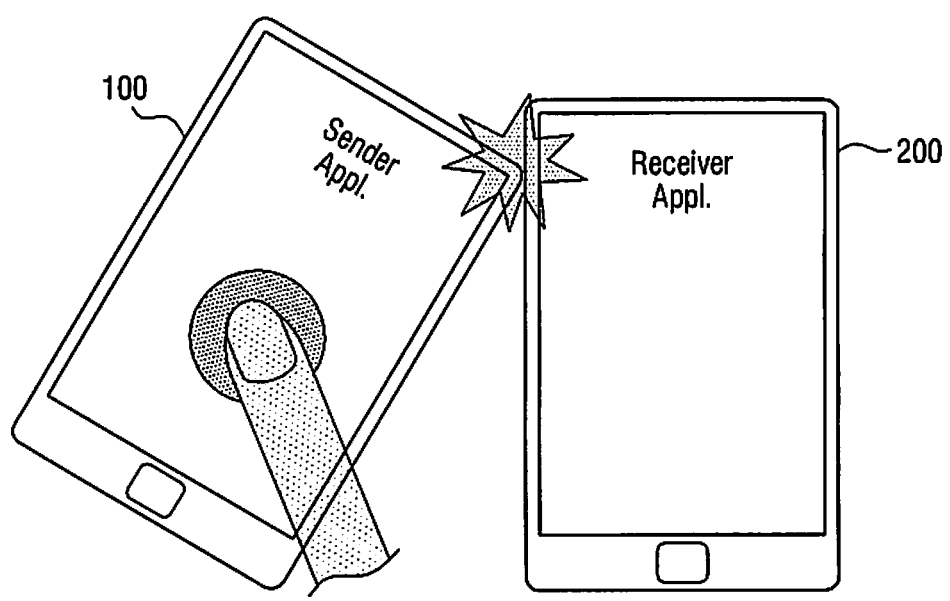

FIG. 14 is a diagram illustrating an example of a method to execute the Bluetooth standby mode, and FIGS. 15 to 17 are diagrams illustrating examples of a movement for executing the transmission of a file according to an embodiment of the present invention.

Referring to FIG. 14, the user may execute the Bluetooth standby mode by long-touching the screens of the first terminal 100 and the second terminal 200.

Referring to FIG. 15, the user may transmit a file from the first terminal 100 to the second terminal 200 by tilting the first terminal 100. Referring to FIG. 16, the user may also transmit a file from the first terminal 100 to the second terminal 200 by shaking the first terminal 100. Referring to FIG. 17, the user may also transmit a file from the first terminal 100 to the second terminal 200 by bringing the first terminal 100 into contact with the second terminal 200, for example, by hitting the second terminal 200 with the first terminal 100.

The methods for executing described herein with respect to FIGS. 15 to 17, are merely provided as examples. The user may execute the Bluetooth standby mode and may execute the transmission of a file in various manners other than those set forth herein in accordance with embodiments of the present invention.

A direct view function provided after receiving a file by the second terminal 200 is described as follows with reference to FIGS. 18 to 22.

Figure 18:
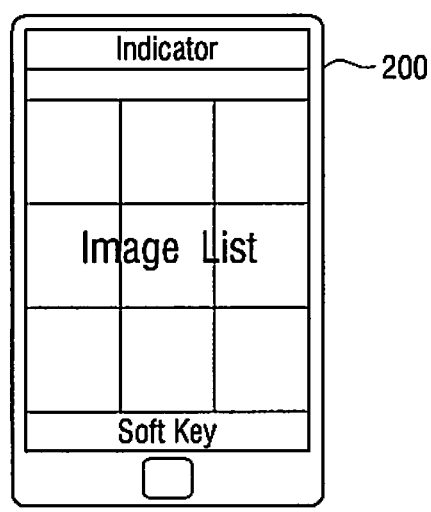
FIGS. 18 and 19 are diagrams illustrating an example of executing a direct view of an image file received by the second terminal.
Figure 19:
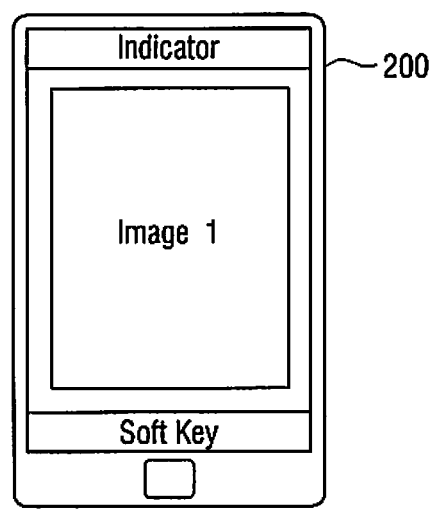

FIGS. 18 and 19 are diagrams illustrating an example of executing a direct view function for an image file received by the second terminal 200 according to an embodiment of the present invention.

Referring to FIGS. 18 and 19, upon receiving an image file with an image list screen displayed on the second terminal 200, the second terminal 200 may readily display the received image file on its screen. More specifically, when an application currently being executed by the second terminal 200 is an application capable of executing the received image file, the received image file may be readily executed by the current application, and may thus be readily displayed on the screen of the second terminal 200.

Since the received image file is readily displayed on the screen of the second terminal 200, it is possible for the user to readily identify the corresponding image file requiring additional user manipulation of the second terminal 200.

An example of displaying a message confirming the completion of the execution of a direct view function is described as follows with reference to FIGS. 20 to 22.

Figure 20:
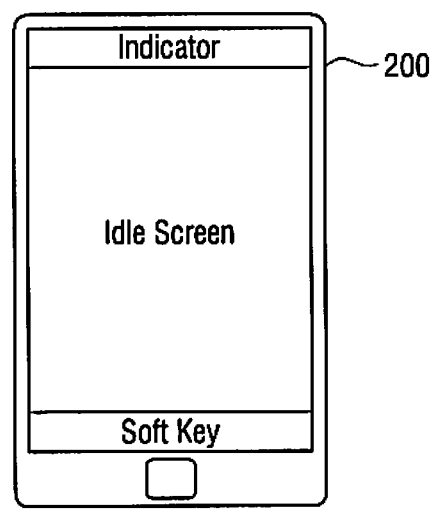
FIGS. 20 to 22 are diagrams illustrating an example of displaying a message that confirms the completion of the execution of a direct view function.
Figure 21:
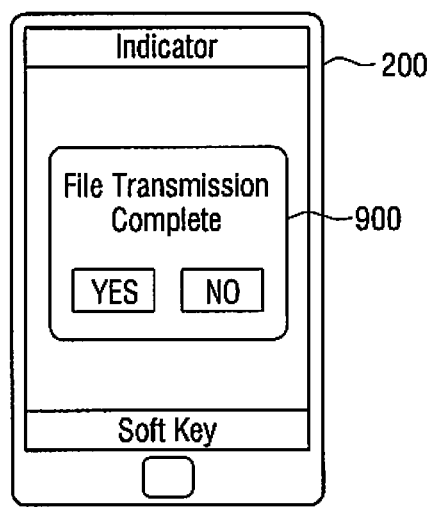
Figure 22:
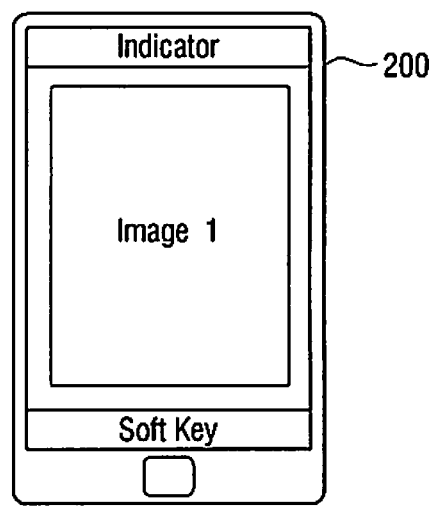

FIGS. 20 to 22 are diagrams illustrating an example of displaying a message confirming the completion of the execution of a direct view function according to an embodiment of the present invention.

Referring to FIGS. 20 and 21, upon receiving an image file by the second terminal 200 with an idle screen displayed on the screen of the second terminal 200, a message 900 that confirms the completion of the execution of a direct view function is displayed on the screen of the second terminal 200. In response to the user selecting "Yes" from the message 900, the second terminal 200 displays the received image file on its screen.

Through this process, the user is able to choose whether to use a direct view function in connection with a received image file by using the message 900.

The first terminal 100 and the second terminal 200 may be Bluetooth-paired using a voice signal. An example of Bluetooth-pairing the first terminal 100 and the second terminal 200 by using a voice signal is described as follows with reference to FIG. 1.

According to a first such example, the voice output unit 123 of the first terminal 100 outputs a voice signal in response to the detection of a movement of the first terminal 100 during the Bluetooth standby mode.

The control unit 170 of the first terminal 100 sets the first terminal 100 in the Bluetooth standby mode. In response to the detection of a movement during the Bluetooth standby mode, the control unit 170 selects the second terminal 200 as a target terminal for the first terminal to Bluetooth-communicate with by using a voice signal. The control unit 170 controls the first terminal to be Bluetooth-paired with the selected target terminal, i.e., the second terminal 200. The control unit 170 controls data to be transmitted to the second terminal 200 via a Bluetooth communication.

For example, the control unit 170 may control the time of the transmission of a voice signal to the second terminal 200 to be stored in the storage unit 140, and may receive the time of the receipt of the voice signal by the second terminal 200. In this example, if the transmission time of the voice signal coincides with the receipt time of the voice signal, the control unit 170 may select the second terminal 200 as a target terminal for the first terminal to Bluetooth-communicate with.

In another example of Bluetooth pairing according to an embodiment of the present invention, the control unit 170 of the first terminal 100 controls first information corresponding to the voice signal to be stored in the storage unit 140, and may receive second information corresponding to the voice signal from the second terminal 200. In this example, if the first information coincides with the second information, the control unit 170 selects the second terminal 200 as a target terminal for the first terminal to Bluetooth-communicate with. The first information and the second information may represent various properties that identify the voice signal. For example, the first information and the second information may include frequency information, pattern information, and tone information of the voice signal.

The voice input unit 225 of the second terminal 200 may receive a voice signal transmitted by the first terminal 100.

Upon receiving the voice signal from the first terminal 100, the control unit 270 of the second terminal 200 performs a Bluetooth-pairing with the first terminal 100 using the received voice signal, and receipt of a file from the first terminal 100 via a Bluetooth communication.

For example, in response to the receipt of a voice signal from the first terminal 100, the control unit 270 may control the time of the receipt of the voice signal to be stored in the storage unit 240, and to be transmitted to the first terminal 100. The control unit 270 may control the second terminal 200 to be Bluetooth-paired with the first terminal 100 based on the time of the receipt of the voice signal. More specifically, if the time of the voice signal by the first terminal 100 coincides with the time of the receipt of the voice signal by the second terminal 200, the first terminal 100 transmits a pairing request to the second terminal 200. In response to the receipt of the pairing request from the first terminal 100, the control unit 270 controls the second terminal 200 to be Bluetooth-paired with the first terminal 100.

In another example of Bluetooth pairing according to an embodiment of the present invention, upon receiving a voice signal from the first terminal, the control unit 270 analyzes the voice signal, and controls information corresponding to the voice signal, which is obtained by analyzing the voice signal, to be stored in the storage unit 240. The information corresponding to the voice signal may represent one or more properties that identify the voice signal. For example, the information on the voice signal may include frequency information, pattern information, and tone information of the voice signal. More specifically, the control unit 270 analyzes the frequency, pattern and tone of the voice signal, and stores the results of the analysis in the storage unit 240.

The control unit 270 controls the voice signal information present in the storage unit 240 to be transmitted to the first terminal 100, and controls the second terminal 200 to be Bluetooth-paired with the first terminal based on the corresponding voice signal information. More specifically, if first information on the voice signal, which is provided by the first terminal 100, coincides with second information on the voice signal, which is provided by the second terminal 200, the first terminal 100 transmits a pairing request to the second terminal 200. Upon receiving the pairing request from the first terminal 100, the control unit 270 controls the second terminal 200 to be Bluetooth-paired with the first terminal 100. Accordingly, the first terminal 100 and the second terminal 200 are Bluetooth-paired with each other by using a voice signal.

Examples of Bluetooth-pairing the first terminal 100 and the second terminal 200 according to an embodiment of the present invention are described as follows with reference to FIGS. 23 to 37.

Figure 23:
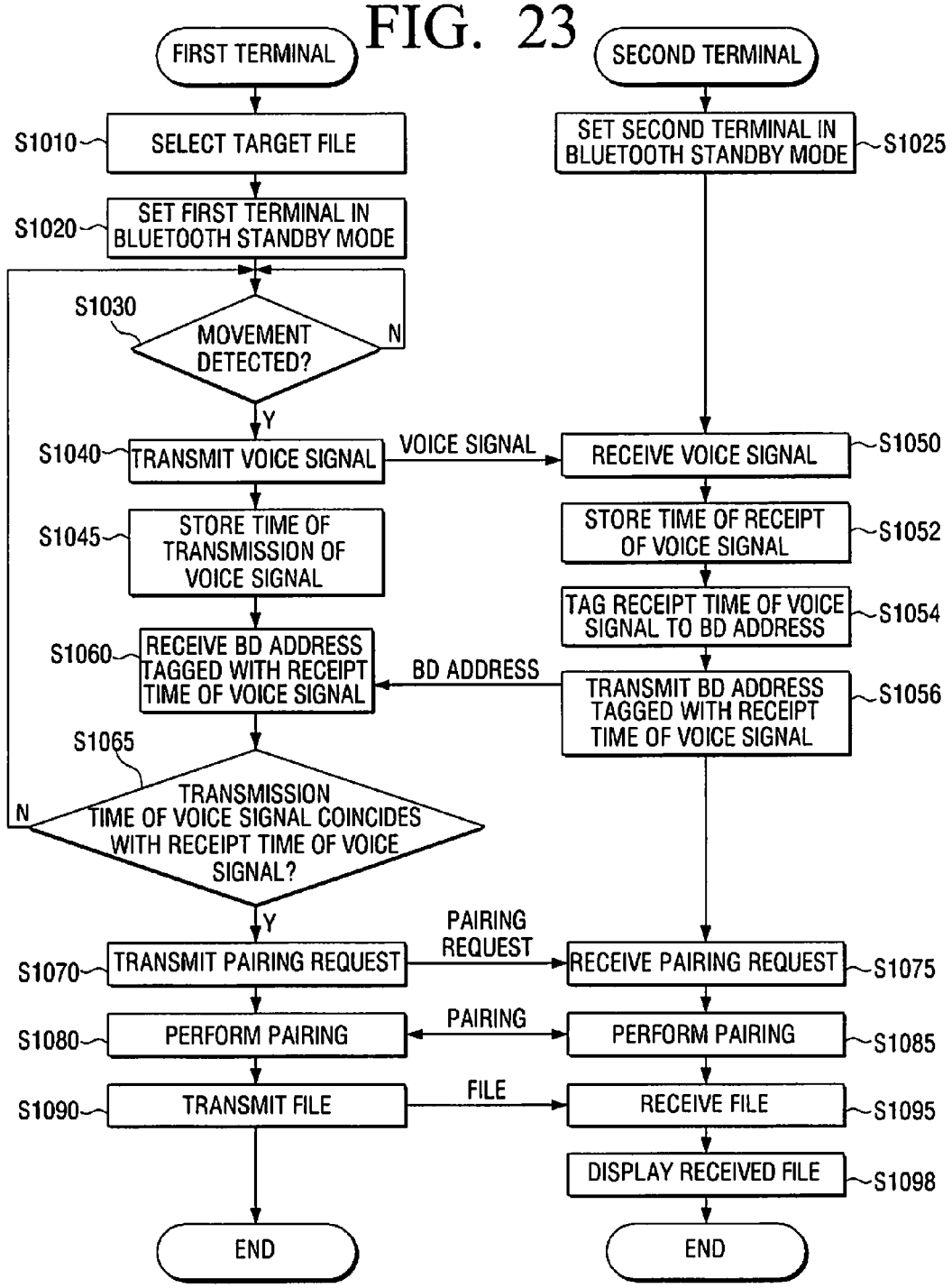
FIG. 23 is a flowchart illustrating a Bluetooth communication method according to an embodiment of the present invention, in which Bluetooth pairing is performed using the times of the transmission and receipt of a voice signal.

FIG. 23 is a flowchart illustrating a Bluetooth communication method according to an embodiment of the present invention, in which Bluetooth pairing is performed using the times of the transmission and receipt of a voice signal.

Referring to FIG. 23, the first terminal 100 selects a target file to be transmitted in accordance with the user's selection, in step S1010. Upon receiving a command from the user, the first terminal 100 is set in the Bluetooth standby mode, in step S1020. For example, in response to the user pressing a button for switching to the Bluetooth standby mode, the first terminal 100 is placed in the Bluetooth standby mode.

Upon receiving a command from the user, the second terminal 200 is also set in the Bluetooth standby mode, in step S1025. The first terminal 100 and the second terminal 200 may Bluetooth-communicate with each other when placed in the Bluetooth standby mode.

The first terminal 100 determines whether the first terminal 100 is moved, in step S1030. Upon detecting a movement, in step S1030-Y, the first terminal 100 transmits a voice signal, in step S1040, and stores a time of the transmission of the voice signal, in step S1045.

The second terminal 200 receives the voice signal, in step S1050, and stores a time of the receipt of the voice signal, in step S1052. The second terminal 200 tags the receipt time of the voice signal to a BD address, in step S1054, and transmits the BD address to the first terminal 100, in step S1056. More specifically, the second terminal 200 transmits the receipt time of the voice signal to the first terminal 100 by tagging the receipt time of the voice signal to a BD address.

The first terminal 100 receives the BD address tagged with the receipt time of the voice signal from the second terminal 200, in step S1060. More specifically, the first terminal 100 receives the receipt time of the voice signal from the second terminal 200 by receiving the BD address tagged with the receipt time of the voice signal.

The first terminal 100 determines whether the transmission time of the voice signal coincides with the receipt time of the voice signal, in step. Upon determining that the transmission time of the voice signal does not coincide with the receipt time of the voice signal, in step S1065-N, the first terminal 100 repeats step S1030.

Upon determining that the transmission time of the voice signal coincides with the receipt time of the voice signal, in step S1065-Y, the first terminal 100 transmits a pairing request to the second terminal 200, in step S1070. The second terminal 200 receives the pairing request from the first terminal 100, in step S1075. The first terminal 100 and the second terminal 200 are paired with each other, in steps S1080 and S1085.

The first terminal 100 transmits the target file to the second terminal 200 via a Bluetooth communication, in step S1090. The second terminal 200 receives the target file from the first terminal 100, in step S1095, and displays the target file on its screen, in step S1098.

In this manner, a voice signal is used to Bluetooth-pair the first terminal 100 and the second terminal 200, in order to transmit data between the first terminal 100 and the second terminal 200 via a Bluetooth communication.

Figure 24:
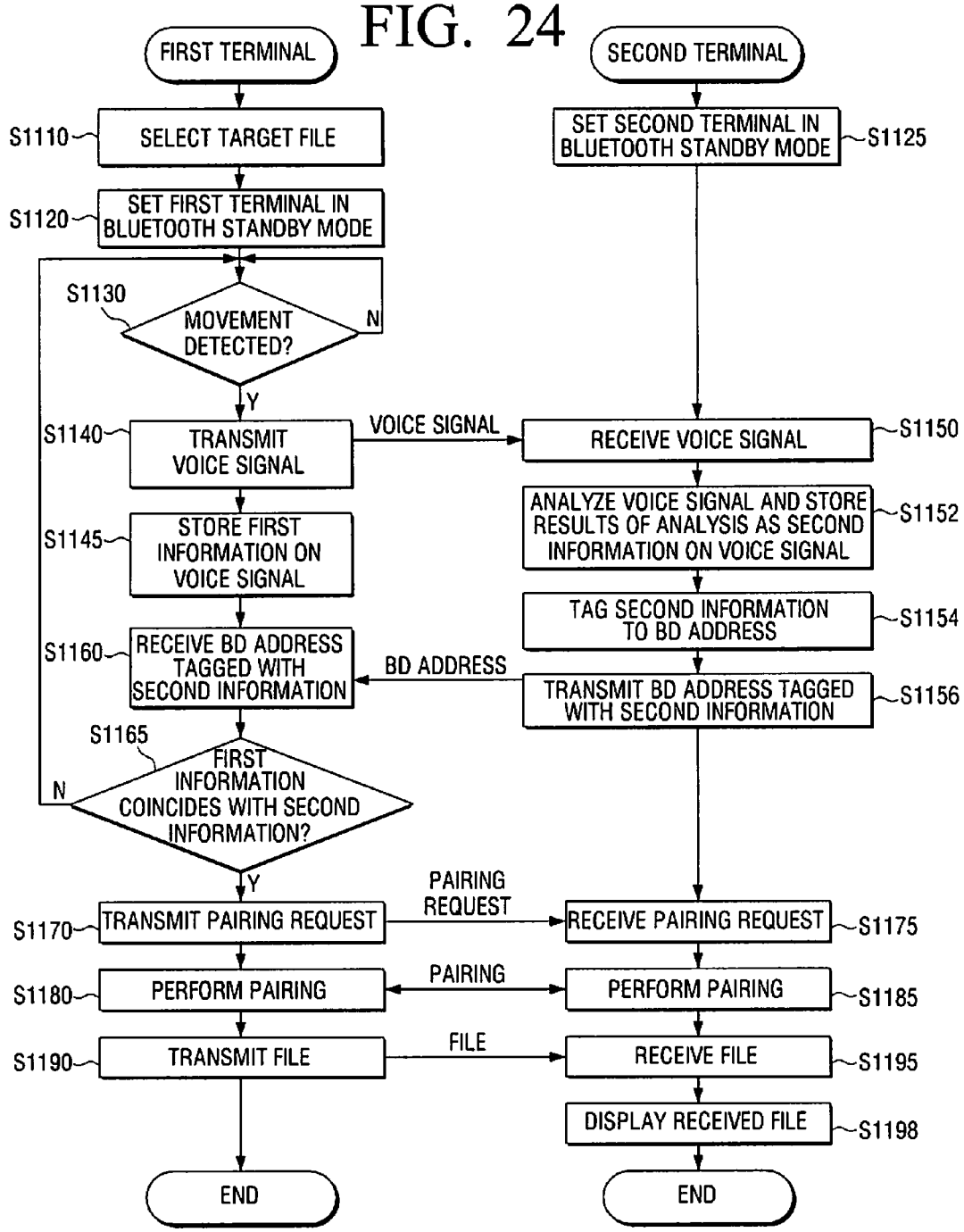
FIG. 24 is a flowchart illustrating a Bluetooth communication method according to an embodiment of the present invention, in which Bluetooth pairing is performed using information of a voice signal.

FIG. 24 is a flowchart illustrating a Bluetooth communication method according to another embodiment of the present invention, in which Bluetooth-pairing is performed using information on a voice signal.

Referring to FIG. 24, the first terminal 100 selects a target file to be transmitted in accordance with the user's selection, in step S1110. Upon receiving a command from the user, the first terminal 100 is set in the Bluetooth standby mode, in step S1120. For example, in response to the user pressing a button for switching to the Bluetooth standby mode, the first terminal 100 is placed in the Bluetooth standby mode.

Upon receiving a command from the user, the second terminal 200 is set in the Bluetooth standby mode, in step S1125. The first terminal 100 and the second terminal 200 communicate with each other over a Bluetooth connection when placed in the Bluetooth standby mode.

The first terminal 100 determines whether the first terminal 100 is moved, in step S1130. If movement is detected, in step S1130-Y, the first terminal 100 transmits a voice signal, in step S1140, and stores first information corresponding to the voice signal, in step S1145. The first information represents one or more properties that identify the voice signal. For example, the first information may include frequency information, pattern information, and tone information of the voice signal.

The second terminal 200 receives the voice signal, in step S1150, and stores second information corresponding to the voice signal, in step S1152. The second information represents one or more properties that identify the voice signal. For example, the second information may include frequency information, pattern information, and tone information of the voice signal. The second terminal 200 analyzes the frequency, pattern, and tone of the voice signal, and stores the results of the analysis.

The second terminal 200 tags the second information to a BD address, in step S1154, and transmits the BD address to the first terminal 100, in step S1156. More specifically, the second terminal 200 transmits the second information to the first terminal 100 by tagging the second information to a BD address.

The first terminal 100 receives the BD address tagged with the second information from the second terminal 200, in step S1160. More specifically, the first terminal 100 receives the second information from the second terminal 200 by receiving the BD address tagged with the second information.

The first terminal 100 determines whether the first information coincides with the second information, in step S1165. Upon a determination that the first information does not coincide with the second information, in step S1165-N, the first terminal 100 repeats step S1130.

Upon a determination that the first information coincides with the second information, in step S1165-Y, the first terminal 100 transmits a pairing request to the second terminal 200, in step S1170. The second terminal 200 receives the pairing request from the first terminal 100, in step S1175. The first terminal 100 and the second terminal 200 are paired with each other, in steps S1180 and S1185.

The first terminal 100 transmits the target file to the second terminal 200 via a Bluetooth communication, in step S1190. The second terminal 200 receives the target file from the first terminal 100, in step S1195, and displays the target file on its screen, in step S1198.

Through this process, a voice signal is used to Bluetooth-pair the first terminal 100 and the second terminal 200 and transmit data between the first terminal 100 and the second terminal 200 via Bluetooth communication.

Figure 25:
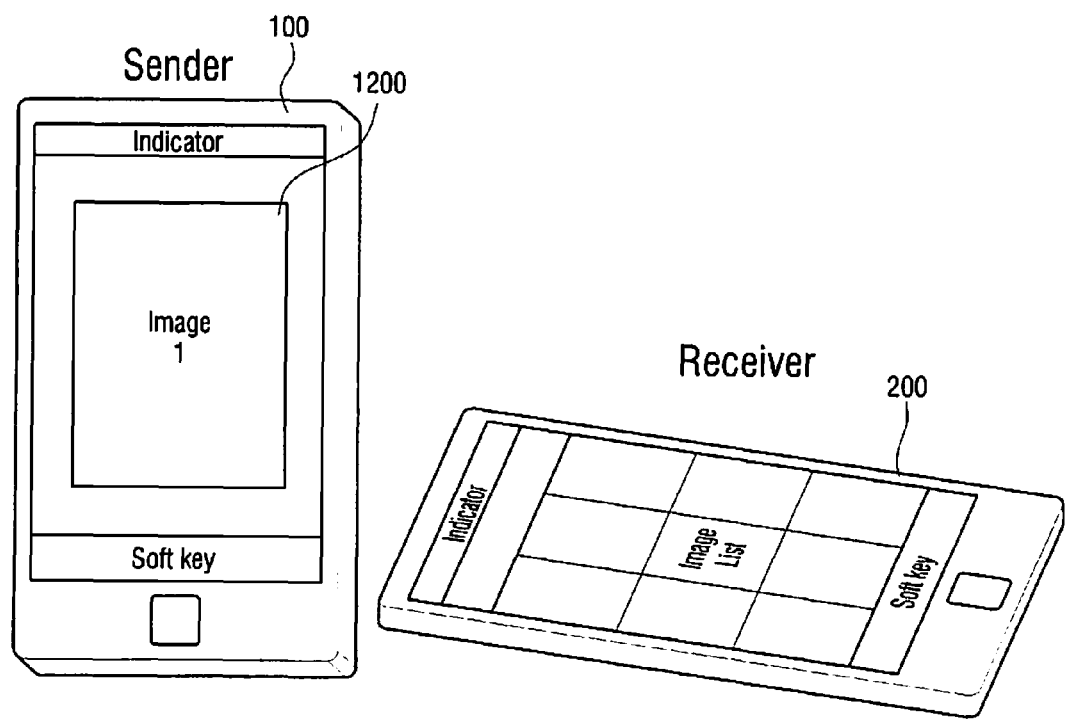
FIGS. 25 to 27 are diagrams illustrating an example of performing Bluetooth pairing and the transmission of a file using a voice signal.
Figure 26:
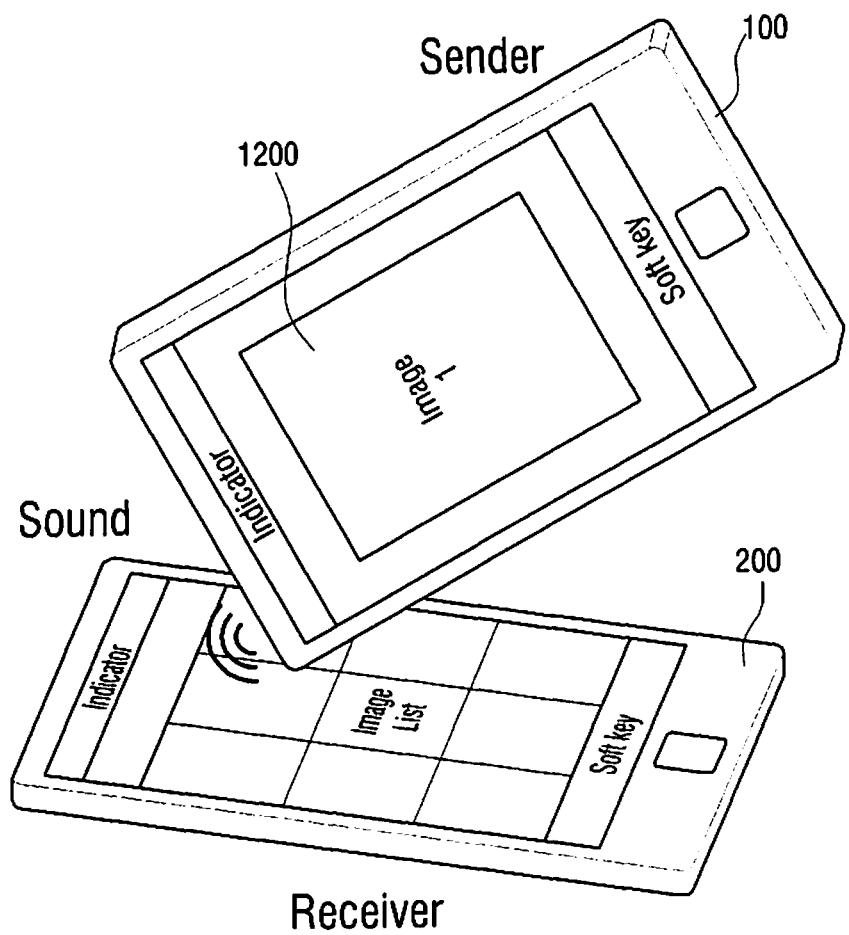
Figure 27:
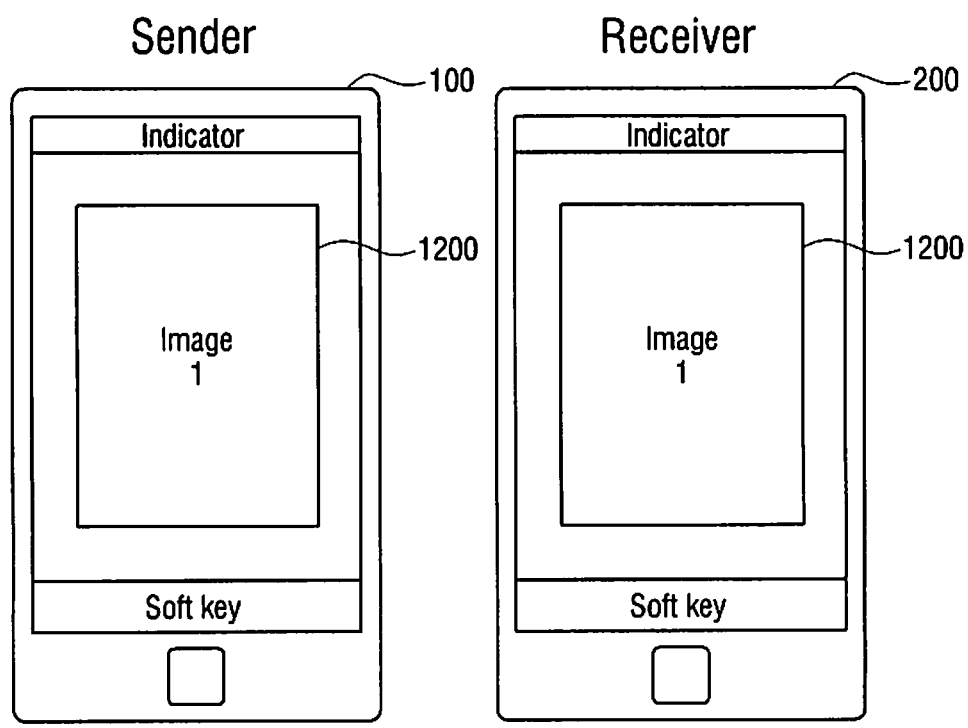

FIGS. 25 to 27 are diagrams illustrating an example of performing Bluetooth pairing and the transmission of a file by using a voice signal according to an embodiment of the present invention.

Referring to FIG. 25, image 1 1200 is displayed on the screen of the first terminal 100, and is selected by the first terminal 100 as a target file to be transmitted.

The second terminal 200 is laid down. When laid down, the second terminal 200 may be in a standby state for receiving a file via a Bluetooth communication.

FIG. 26 illustrates an example of Bluetooth-pairing the first terminal 100 and the second terminal 200 by using a voice signal. Referring to FIG. 26, the first terminal 100 is tilted toward the screen of the second terminal 200. Upon detecting movement such as a tilt, the first terminal 100 transmits a voice signal to the second terminal 200. The second terminal 200 receives the voice signal, and is Bluetooth-paired with the first terminal 100.

In response to the Bluetooth pairing of the first terminal 100 and the second terminal 200, the first terminal 100 transmits image 1 1200 to the second terminal 200 via a Bluetooth communication.

FIG. 27 illustrates a case in which the transmission of image 1 1200 from the first terminal 100 to the second terminal 200 is complete. Referring to FIG. 27, upon receiving image 1 1200, the second terminal 200 displays image 1 1200 on its screen. Through this process, a voice signal is used to Bluetooth-pair the first terminal 100 and the second terminal 200 in order to transmit a file between the first terminal 100 and the second terminal 200.

In addition, simply tilting the first terminal 100, initiates Bluetooth-pairing of the first terminal 100 and the second terminal 200 and transmission of a file from the first terminal 100 to the second terminal 200. Therefore, the user may intuitively transmit a file from the first terminal 100 to the second terminal 200 by mimicking the gesture of pouring water into the second terminal 200 with the first terminal 100.

FIGS. 28 to 31 are diagrams illustrating an example of Bluetooth-pairing the first terminal 100 and the second terminal 200 by using a voice signal during the Bluetooth standby mode according to an embodiment of the present invention.

Figure 28:
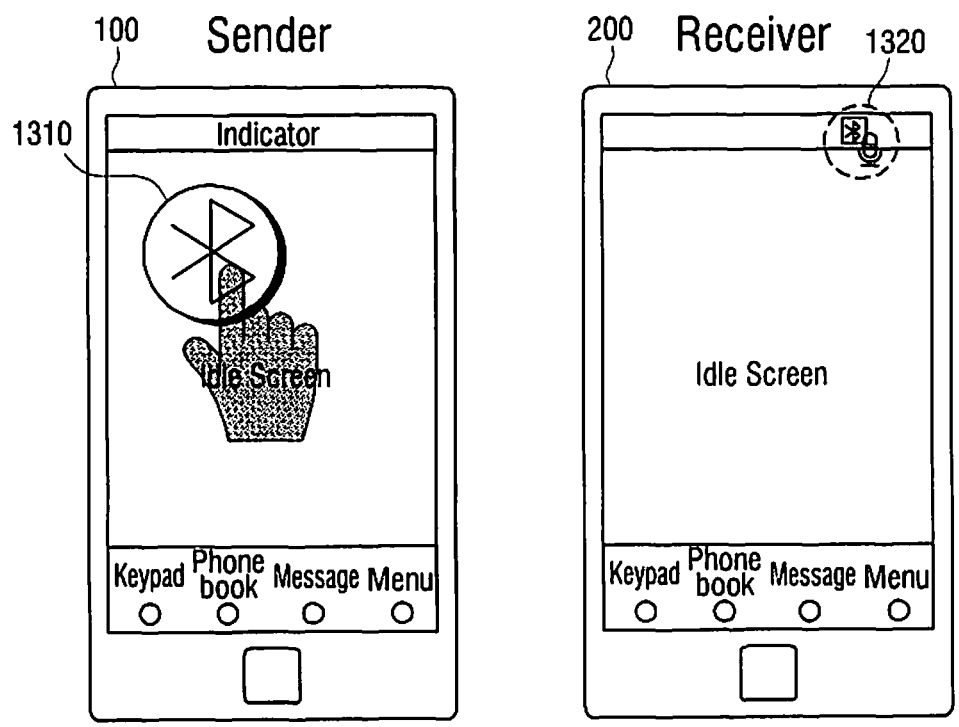
FIGS. 28 to 31 are diagrams illustrating an example of performing Bluetooth pairing using a voice signal.

FIG. 28 illustrates a case in which the user selects a Bluetooth icon 1310 on the screen of the first terminal 100. Referring to FIG. 28, an icon 1320 indicating that the second terminal 200 is in the Bluetooth standby mode is displayed at the top of the screen of the second terminal 200.

Figure 29:
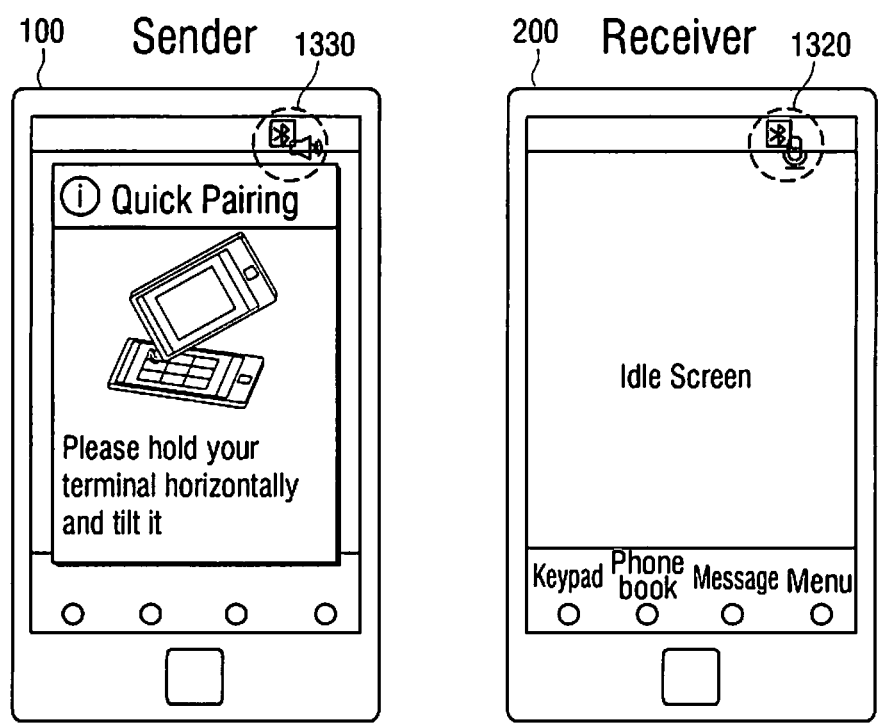

In response to the selection of the Bluetooth icon 1310 by the user, a Bluetooth pairing guide message is displayed on the screen of the first terminal 100, and a Bluetooth standby mode display icon 1330 is displayed at the top of the screen of the first terminal 100, as shown in FIG. 29. The Bluetooth standby mode display icon 1330 may be an icon indicating that a voice signal may be output by the first terminal 100.

Figure 30:
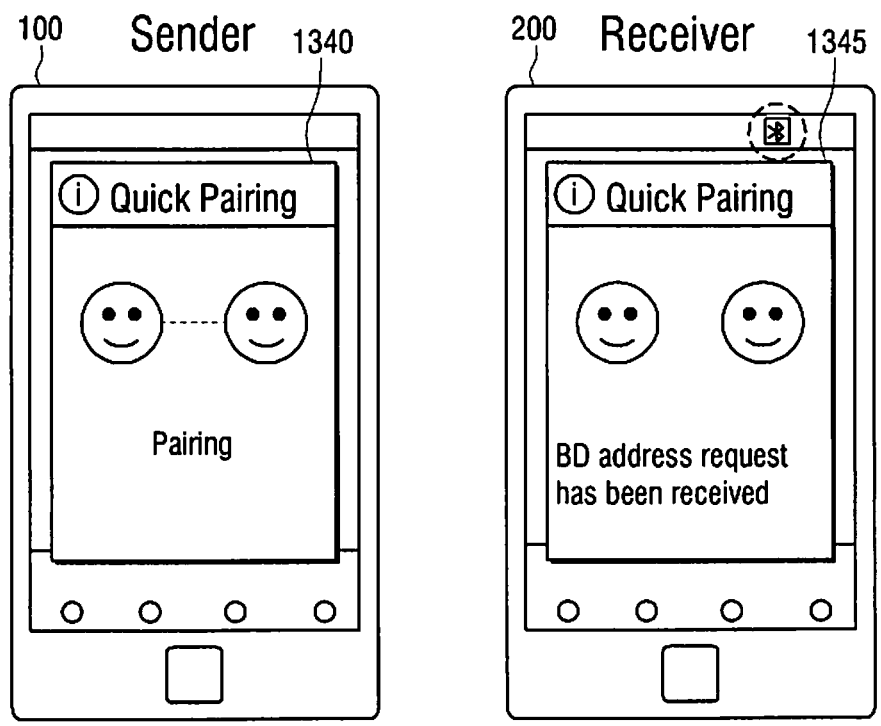

In response to the user entering a motion manipulation by tilting the first terminal 100 toward the screen of the second terminal 200, the first terminal 100 and the second terminal 200 exchange a voice signal with each other, and are Bluetooth-paired with each other, as shown in FIG. 30.

Referring to FIG. 30, the first terminal 100 displays a message 1340 requesting Bluetooth pairing, and the second terminal 200 displays a message 1345 that confirms the receipt of a Bluetooth pairing request.

Figure 31:
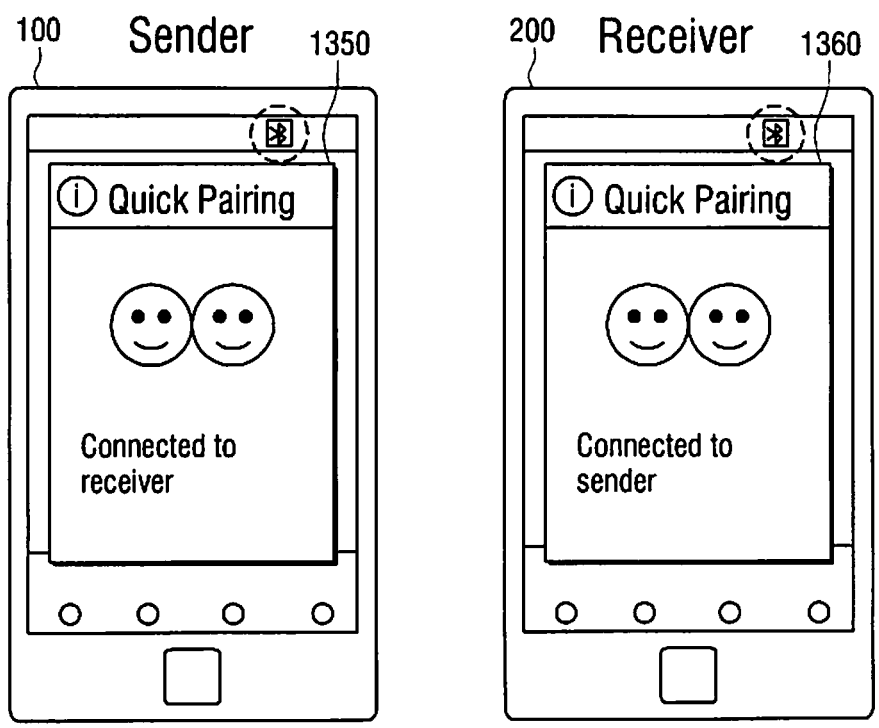

Referring to FIG. 31, in response to the Bluetooth pairing of the first terminal 100 and the second terminal 200, messages 1350 and 1360 indicating that the first terminal 100 and the second terminal 200 are connected is displayed on the screens of the first terminal 100 and the second terminal 200, respectively.

Through this process, a voice signal is used to Bluetooth-pair the first terminal 100 and the second terminal 200, even during the Bluetooth standby mode.

FIGS. 32 to 37 are diagrams illustrating an example of Bluetooth-pairing the first terminal 100 and the second terminal 200 by using a voice signal according to an embodiment of the present invention.

Figure 32:
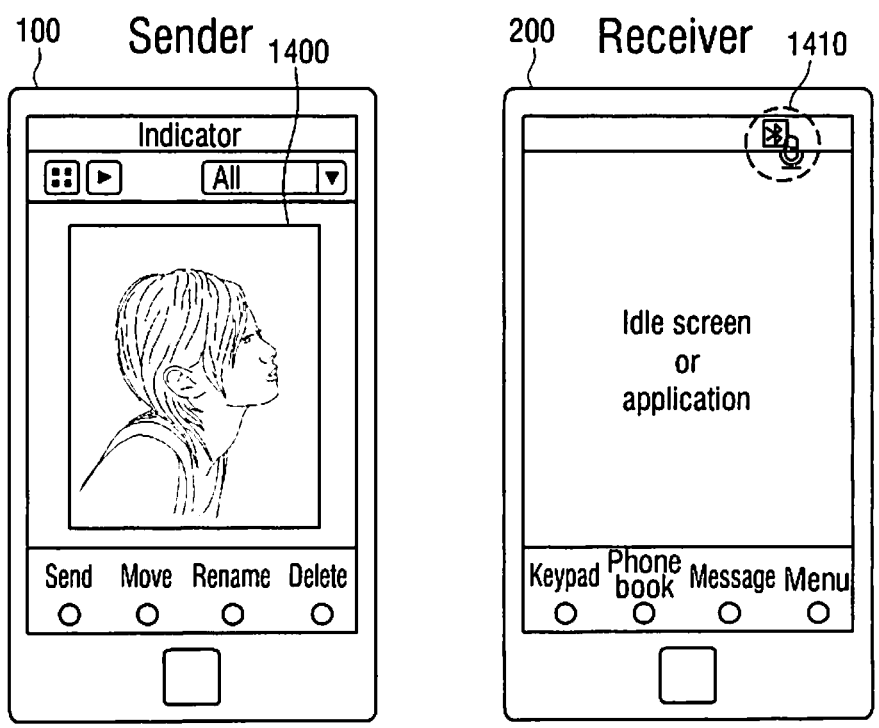
FIGS. 32 to 37 are diagrams illustrating another example of performing Bluetooth pairing and the transmission of a file using a voice signal.

Referring to FIG. 32, a photo file 1400, is selected by the first terminal 100 as a target file to be transmitted, is displayed on the screen of the first terminal 100. An icon 1410 indicating that the second terminal 200 is in the Bluetooth standby mode is displayed at the top of the screen of the second terminal 200.

Figure 33:
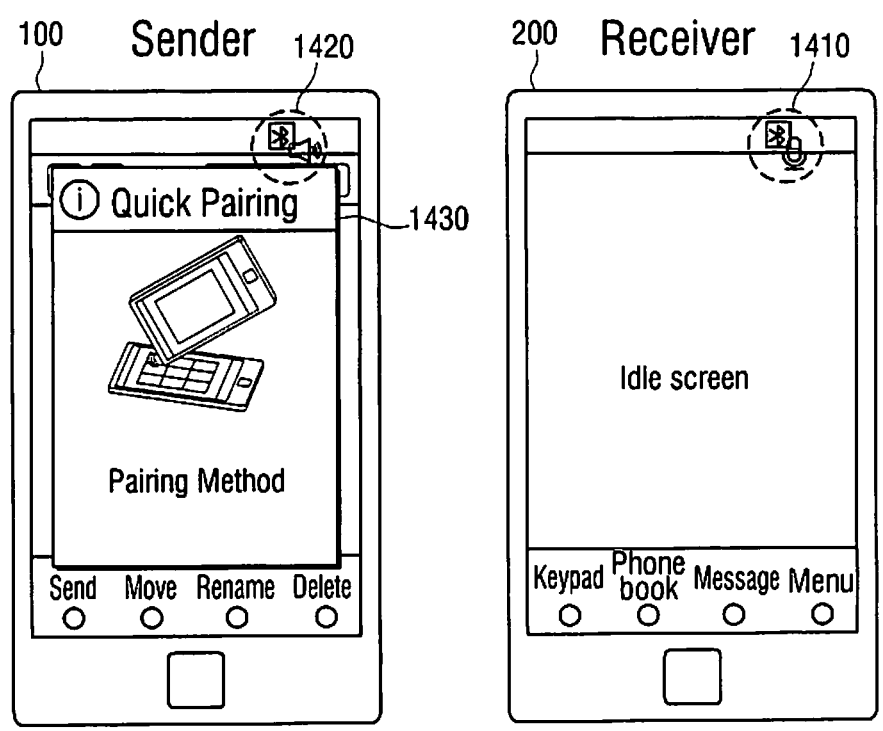

Referring to FIG. 33, when the second terminal 200 is in the Bluetooth standby mode, a Bluetooth pairing guide message 1430 is displayed on the screen of the first terminal 100, and a Bluetooth standby mode display icon 1420 is displayed at the top of the screen of the first terminal 100. The Bluetooth standby mode display icon 1420 indicates that a voice signal may be output by the first terminal 100.

Figure 34:
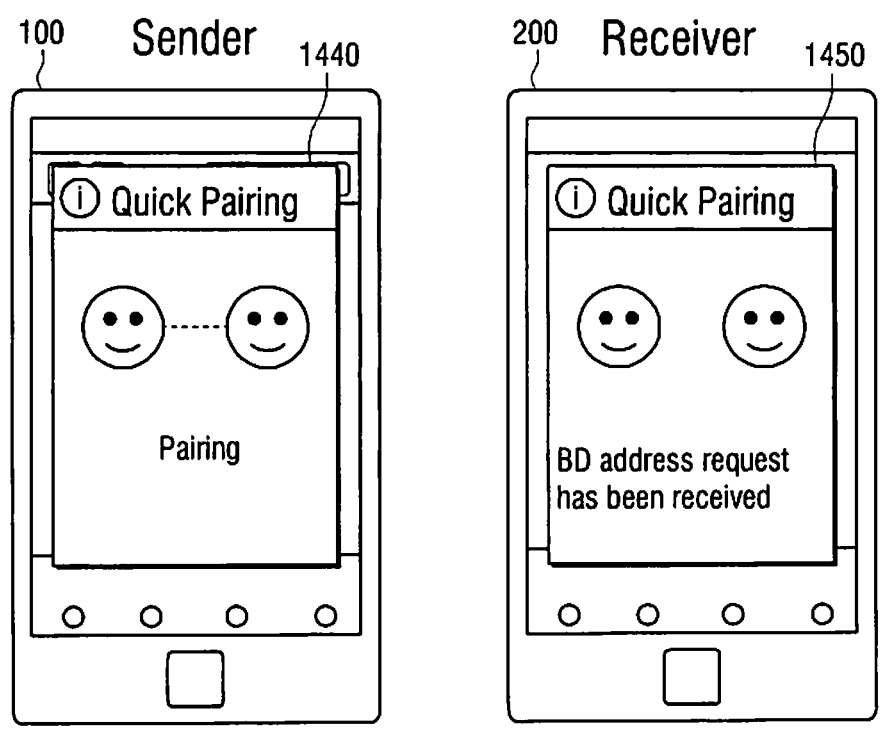

In this case, referring back to FIG. 26, in response to the user tilting the first terminal 100 toward the screen of the second terminal 200, the first terminal 100 and the second terminal 200 may exchange a voice signal with each other, and may be Bluetooth-paired with each other, as shown in FIG. 34.

Referring to FIG. 34, the first terminal 100 displays a message 1440 requesting Bluetooth pairing, and the second terminal 200 displays a message 1450 that confirms the receipt of a Bluetooth pairing request.

Figure 35:
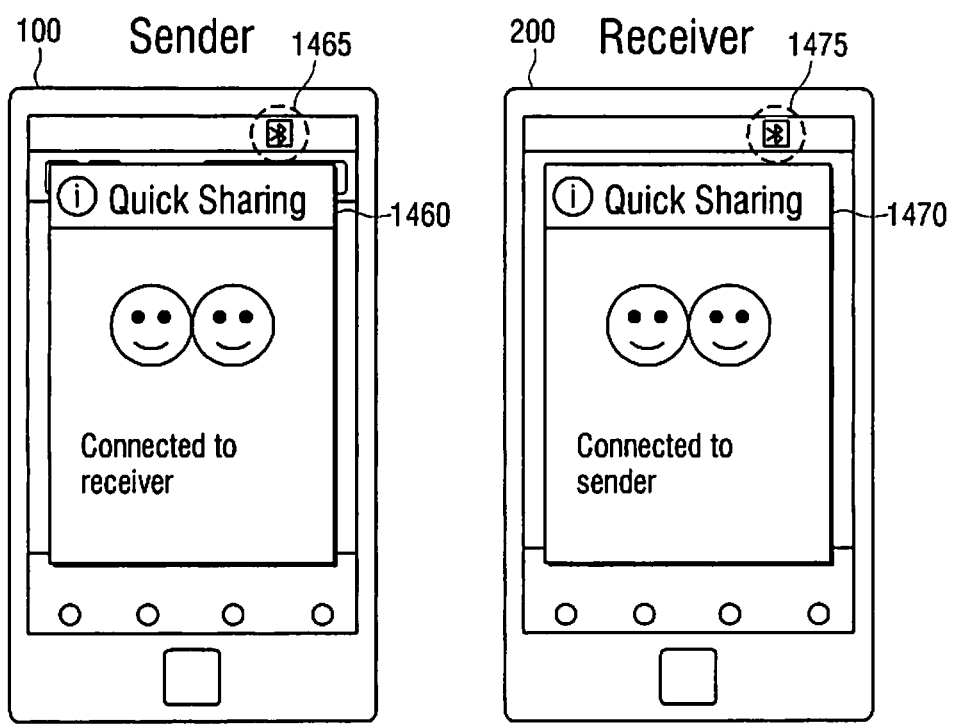

Referring to FIG. 35, in response to the Bluetooth pairing of the first terminal 100 and the second terminal 200, messages 1460 and 1470 indicating that the first terminal 100 and the second terminal 200 are connected are displayed on the screens of the first terminal 100 and the second terminal 200, respectively, and icons 1465 and 1475 that confirm that the first terminal 100 and the second terminal 200 have been Bluetooth-connected are displayed on the screens of the first terminal 100 and the second terminal 200, respectively.

Figure 36:
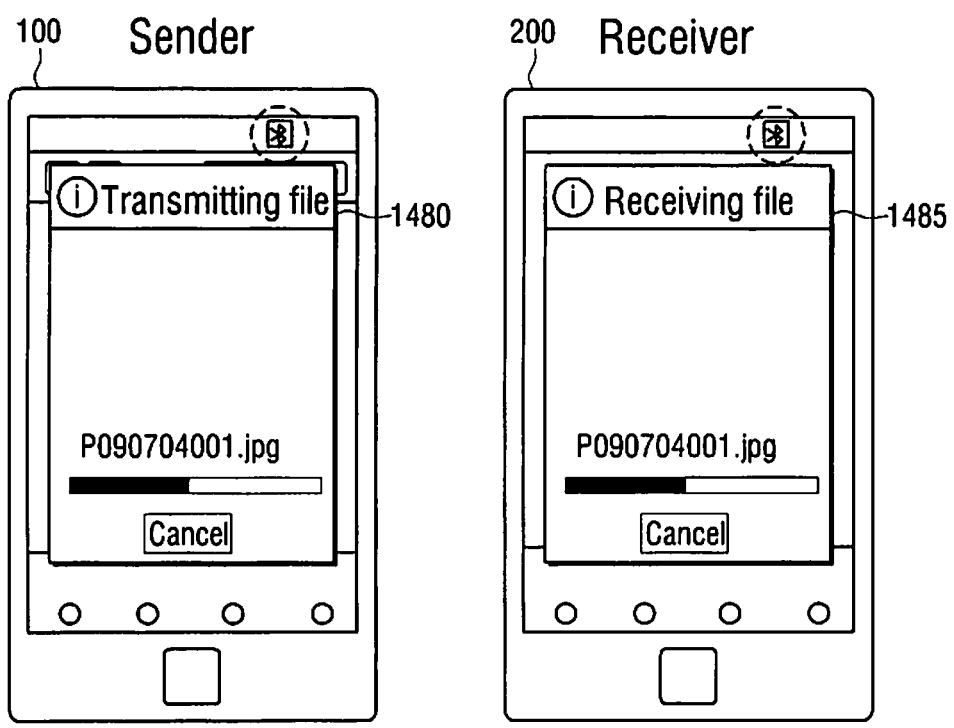

Referring to FIG. 36, the first terminal 100 transmits the photo file 1400 to the second terminal 100, the first terminal 100 displays a file transmission window 1480 on its screen, and the second terminal 200 displays a file reception window 1485 on its screen.

Figure 37:
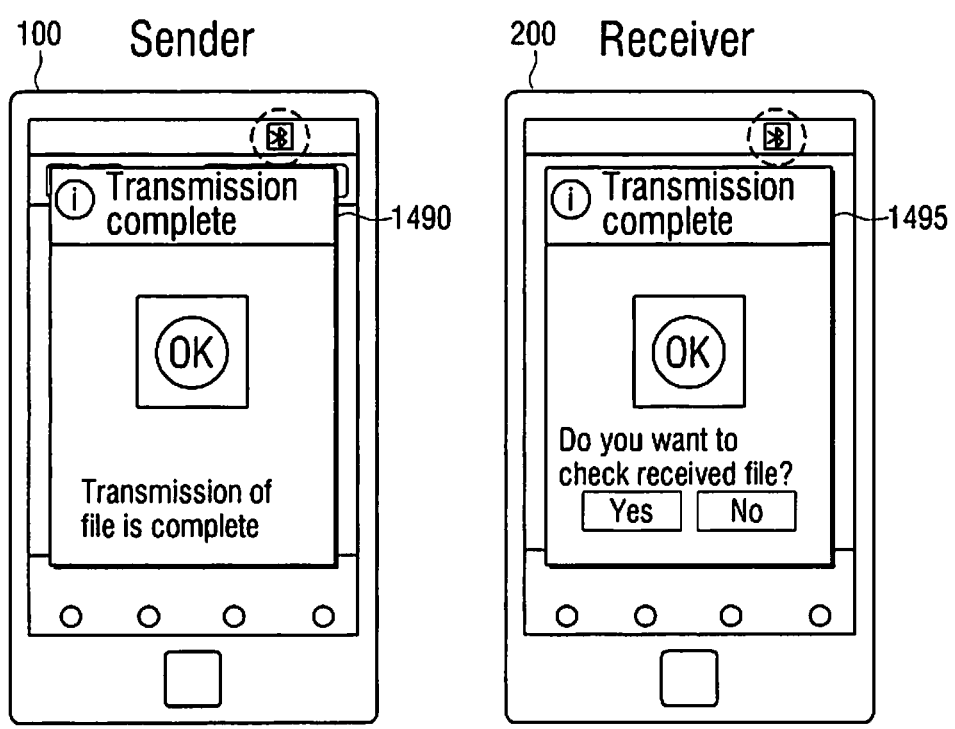

Referring to FIG. 37, in response to the completion of the transmission of the photo file 1400, the first terminal 100 displays a message 1490 indicating that the transmission of the photo file 1400 is complete, and the second terminal 200 displays a message 1495 indicating that the receipt of the photo file 1400 is complete.

In this manner, a voice signal is used to Bluetooth-pair the first terminal 100 and the second terminal 200, even during the Bluetooth standby mode.

In the above-described examples according to embodiments of the present invention, the first terminal 100 may serve as a Bluetooth transmitter, and the second terminal 200 may serve as a Bluetooth receiver. However, in accordance with embodiments of the present invention, either of the first terminal 100 and the second terminal 200 may perform a data transmission function and a data reception function.

For example, in response to the detection of a movement during the Bluetooth standby mode, the first terminal 100 may receive data from the second terminal 200 via a Bluetooth communication. In this case, the second terminal 200 from which no movement is detected may serve as a Bluetooth transmitter.

Examples of the first terminal 100 and the second terminal 200 include nearly all types of devices equipped with a Bluetooth function, such as, for example, mobile terminals, mobile phones, Personal Digital Assistants (PDAs), smart phones, Digital Multimedia Broadcasting (DMB) phones, and the like.

As explained above, according to embodiments of the present invention, it is possible to utilize a Bluetooth communication method for transmitting data to an external terminal via Bluetooth in response to the detection of a movement during a Bluetooth standby mode and a terminal employing the Bluetooth communication method. Therefore, it is possible for a user to easily transmit data between terminals simply moving a terminal.

It will be apparent to those skilled in the art that various modifications and variation can be made in the present invention without departing from the spirit or scope of the invention. Thus, the present invention includes modifications and variations of this invention that are included within the scope of the appended claims and their equivalents.

The invention claimed is:

1. A communication method of a first terminal that communicates with a second terminal via short-range wireless communication, the communication method comprising:
   setting the first terminal in a short-range wireless communication standby mode; and
   transmitting, upon detecting movement of the first terminal during the short-range wireless communication standby mode, data to the second terminal via a short-range wireless communication,
   wherein transmitting the data comprises:
   determining, upon detecting the movement of the first terminal during the short-range wireless communication standby mode, whether the first terminal is paired with the second terminal;
   pairing, in response to a determination that the first terminal is not already paired with the second terminal, the first terminal with the second terminal, wherein pairing the first terminal with the second terminal comprises converting, at the first terminal, a device address of the first terminal to a voice signal and determining, at the second terminal, the device address of the first terminal based on the received voice signal; and
   transmitting the data to the second terminal via the short-range wireless communication.

2. The communication method of claim 1, wherein the voice signals are Dual-Tone Multi-Frequency (DTMF) voice signals.

3. The communication method of claim 1, wherein the second terminal is set in the short-range wireless communication standby mode.

4. The communication method of claim 1, wherein, in the short-range wireless communication standby mode, a voice output unit, a voice input unit, a motion sensor, and a communication unit of the first terminal are activated.

5. A first terminal that communicates with a second terminal via short-range wireless communication, the first terminal comprising:
   a communication unit for transmitting data to the second terminal via a short-range wireless communication; and
   a control unit for setting the first terminal in a short-range wireless communication standby mode, controlling the communication unit to transmit the data to the second terminal via the short-range wireless communication in response to detection of a movement of the first terminal during the short-range wireless communication standby mode, determining, upon detecting the movement of the first terminal during the short-range wireless communication standby mode, whether the first terminal is paired with the second terminal, pairing, in response to a determination that the first terminal is not already paired with the second terminal, the first terminal with the second terminal, wherein pairing the first terminal with the second terminal comprises converting, at the first terminal, a device address of the first terminal to a voice signal and determining, at the second terminal, the device address of the first terminal based on the received voice signal, and transmitting the data to the second terminal via the short-range wireless communication.

6. The first terminal of claim 5, further comprising:
   a motion sensor for detecting the movement of the first terminal,
   wherein, in response to detecting the movement of the first terminal by the motion sensor, the control unit pairs the first terminal with the second terminal, and transmits the data to the second terminal via the short-range wireless communication.

7. The first terminal of claim 5, wherein the voice signals are Dual-Tone Multi-Frequency (DTMF) voice signals.

8. The first terminal of claim 5, wherein the second terminal is set in the short-range wireless communication standby mode.

9. The first terminal of claim 5, wherein, in the short-range wireless communication standby mode a voice input unit, a motion sensor, and the communication unit of the first terminal are activated.

10. A communication method of a short-range wireless communication system in which a first terminal and a second terminal communicate with each other via short-range wireless communication, the communication method comprising:
    setting the first terminal in a short-range wireless communication standby mode;
    setting the second terminal in the short-range wireless communication standby mode;
    determining, in response to detection of a movement during the short-range wireless communication standby mode, whether the first terminal is paired with the second terminal;
    pairing, in response to a determination that the first terminal is not paired with the second terminal, the first terminal with the second terminal, wherein pairing the first terminal with the second terminal comprises converting, at the first terminal, a device address of the first terminal to a voice signal and determining, at the second terminal, the device address of the first terminal based on the received voice signal; and transmitting, in response to detection of the movement of the first terminal during the short-range wireless communication standby mode of the first and second terminals, by the first terminal, data to the second terminal via the short-range wireless communication.

11. A communication method of a second terminal that communicates with a first terminal via short-range wireless communication, the communication method comprising:
  setting the second terminal in a short-range wireless communication standby mode;
  determining, in response to the detection of movement of the first terminal during the short-range wireless communication standby mode, whether the first terminal is paired with the second terminal;
  pairing, in response to a determination that the first terminal is not paired with the second terminal, the first terminal with the second terminal, wherein pairing the first terminal with the second terminal comprises converting, at the first terminal, a device address of the first terminal to a voice signal and determining, at the second terminal, the device address of the first terminal based on the received voice signal; and
  receiving, upon detection of the movement of the first terminal by the first terminal, during the short-range wireless communication standby mode, data from the first terminal via a short-range wireless communication.

12. A communication method of a first terminal that communicates with a second terminal via short-range wireless communication, the short-range wireless communication method comprising:
  setting the first terminal in a short-range wireless communication standby mode;
  selecting, in response to detection of a movement during the short-range wireless communication standby mode, the second terminal as a target terminal for the first terminal for short-range wireless communication by using a voice signal;
  determining, in response to the detection of the movement during the short-range wireless communication standby mode, whether the first terminal is paired with the second terminal;
  pairing, in response to a determination that the first terminal is not paired with the second terminal, the first terminal with the second terminal, wherein pairing the first terminal with the second terminal comprises converting, at the first terminal, a device address of the first terminal to a voice signal and determining, at the second terminal, the device address of the first terminal based on the received voice signal; and
  transmitting, by the first terminal, the data to the second terminal via the short-range wireless communication.

13. The communication method of claim 12, wherein selecting the second terminal as a target terminal comprises:
  transmitting, in response to the detection of the movement during the short-range wireless communication standby mode, the voice signal;
  storing a time of the transmission of the voice signal;
  receiving a time of receipt of the voice signal from the second terminal; and
  selecting, in response to the transmission time of the voice signal coinciding with the receipt time of the voice signal, the second terminal as the target terminal.

14. The communication method of claim 12, wherein selecting the second terminal as a target terminal comprises:

transmitting, in response to the detection of the movement during the short-range wireless communication standby mode, the voice signal;
storing first information corresponding to the voice signal;
receiving second information corresponding to the voice signal from the second terminal; and
selecting, in response to a determination that the first information coincides with the second information, the second terminal as the target terminal.

15. A first terminal that communicates with a second terminal via short-range wireless communication, the first terminal comprising:
  a communication unit for transmitting data to or receives data from the second terminal via a short-range wireless communication; and
  a control unit for setting the first terminal in a short-range wireless communication standby mode,
  wherein, in response to detection of a movement during the short-range wireless communication standby mode, the control unit selects the second terminal as a target terminal for the first terminal to perform short-range wireless communication with by using a voice signal, pairs, via short-range wireless communication, the first terminal with the second terminal, determines whether the first terminal is paired with the second terminal, pairs, in response to a determination that the first terminal is not already paired with the second terminal and in response to the detection of the movement, the first terminal with the second terminal, wherein pairing the first terminal with the second terminal comprises converting, at the first terminal, a device address of the first terminal to a voice signal and determining, at the second terminal, the device address of the first terminal based on the received voice signal, and transmits data to the second terminal via the short-range wireless communication.

16. The first terminal of claim 15, further comprising:
  a voice output unit for transmitting the voice signal in response to the detection of the movement during the short-range wireless communication standby mode,
  wherein the control unit controls a time of the transmission of the voice signal to be stored, receives a time of receipt of the voice signal from the second terminal, and, in response to a determination that the transmission time of the voice signal coincides with the receipt time of the voice signal, selects the second terminal as the target terminal.

17. The first terminal of claim 15, further comprising:
  a voice output unit for transmitting the voice signal in response to the detection of the movement during the short-range wireless communication standby mode,
  wherein the control unit stores first information corresponding to the voice signal, receives second information corresponding to the voice signal from the second terminal, and, in response to a determination that the first information coincides with the second information, selects the second terminal as the target terminal.

18. A communication method of a second terminal that communicates with a first terminal via short-range wireless communication, the communication method comprising:
  setting the second terminal in a short-range wireless communication standby mode;
  determining, in response to the detection of movement during the short-range wireless communication standby mode, whether the first terminal is paired with the second terminal;
  pairing, in response to receipt of a voice signal from the first terminal and in response to a determination that the first terminal is not paired with the second terminal, the second terminal with the first terminal using the voice signal, wherein pairing the first terminal with the second terminal comprises converting, at the first terminal, a device address of the first terminal to the voice signal and determining, at the second terminal, the device address of the first terminal based on the received voice signal; and receiving a file from the first terminal via a short-range wireless communication.

19. The communication method of claim 18, wherein pairing the second terminal with the first terminal comprises:
storing, in response to the receipt of the voice signal from the first terminal, a time of the receipt of the voice signal;
transmitting the receipt time of the voice signal to the first terminal; and
pairing the second terminal with the first terminal based on the receipt time of the voice signal.

20. The communication method of claim 18, wherein pairing the second terminal with the first terminal comprises:
analyzing, in response to the receipt of the voice signal from the first terminal, information corresponding to the voice signal and storing results of the analysis;
transmitting the information corresponding to the voice signal to the first terminal; and
pairing the second terminal with the first terminal based on the information corresponding to the voice signal.

21. A second terminal that communicates with a first terminal via short-range wireless communication, the second terminal comprising:
a communication unit which transmits data to or receives data from the first terminal via short-range wireless communication; and a control unit for, in response to receipt of a voice signal from the first terminal and in response to detection of movement during a short-range wireless communication standby mode, determining whether the first terminal is paired with the second terminal, pairing, based on the determination that the first terminal is not paired with the second terminal and the detection of the movement, the second terminal with the first terminal using the voice signal, wherein pairing the first terminal with the second terminal comprises converting, at the first terminal, a device address of the first terminal to the voice signal and determining, at the second terminal, the device address of the first terminal based on the received voice signal and receiving a file from the first terminal via a short-range wireless communication.

22. The second terminal of claim 21, further comprising:
a voice input unit for receiving the voice signal,
wherein, in response to the receipt of the voice signal from the first terminal, the control unit controls storage of a time of the receipt of the voice signal, transmits the receipt time of the voice signal to the first terminal, and pairs the second terminal with the first terminal based on the receipt time of the voice signal.

23. The second terminal of claim 21, further comprising:
a voice input unit for receiving the voice signal,
wherein, in response to the receipt of the voice signal from the first terminal, the controller analyzes information corresponding to the voice signal, controls storage of results of the analysis, transmits the information corresponding to the voice signal to the first terminal, and pairs the second terminal with the first terminal based on the information corresponding to the voice signal.

* * * * *